US007684706B2

(12) United States Patent
Akasaka et al.

(10) Patent No.: US 7,684,706 B2
(45) Date of Patent: Mar. 23, 2010

(54) SYSTEM AND METHOD FOR TRAFFIC DISTRIBUTION IN AN OPTICAL NETWORK

(75) Inventors: Yoichi Akasaka, Allen, TX (US); Martin Bouda, Plano, TX (US); Takao Naito, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 761 days.

(21) Appl. No.: 11/426,884

(22) Filed: Jun. 27, 2006

(65) Prior Publication Data

US 2007/0092249 A1  Apr. 26, 2007

Related U.S. Application Data

(63) Continuation-in-part of application No. 11/347,434, filed on Feb. 3, 2006, now Pat. No. 7,546,036.

(60) Provisional application No. 60/803,800, filed on Jun. 2, 2006, provisional application No. 60/729,447, filed on Oct. 20, 2005, provisional application No. 60/756,925, filed on Jan. 6, 2006.

(51) Int. Cl.
*H04J 14/00* (2006.01)
(52) U.S. Cl. ............................. 398/72; 398/63; 398/71
(58) Field of Classification Search .............. 398/66–67, 398/72–74
See application file for complete search history.

(56) References Cited

U.S. PATENT DOCUMENTS 4,555,810 A    11/1985   Khoe et al.

(Continued)

FOREIGN PATENT DOCUMENTS

EP    1 028 331 A2    8/2000
EP    1 130 806 A2    9/2001

(Continued)

OTHER PUBLICATIONS

ITU-T Telecommunication Standardization Sector of ITU-T, G.984. 3, "Gigabit-Capable Passive Optical Network (G-PON): Transmission Convergence Layer Specification," Series G: Transmission Systems and Media, Digital Systems and Networks, Digital Sections and Digital Line System—Optical Line Systems for Local and Access Networks, Feb. 2004, 116 pages.

(Continued)

*Primary Examiner*—Dzung D Tran
(74) *Attorney, Agent, or Firm*—Baker Botts L.L.P.

(57) ABSTRACT

In accordance with the teachings of the present invention, a system and method for traffic distribution in an optical network is provided. In a particular embodiment, a traffic distribution module in a passive optical network (PON), includes a filter configured to receive downstream traffic in a first set of one or more wavelengths and a second set of one or more wavelengths from an optical line terminal (OLT), direct the traffic in the first set of wavelengths to a primary power splitter, and direct the traffic in the second set of wavelengths to a first connector. The traffic distribution module also includes a primary power splitter and a plurality of secondary power splitters. The primary power splitter is configured to receive the traffic in the first set of wavelengths and distribute the traffic in the first set to the plurality of secondary power splitters coupled to the primary power splitter such that optical network units (ONUs) in the PON receive the traffic in the first set of wavelengths. The traffic distribution module also includes a first connector configured to couple to a first module connector of a pluggable module and to forward the traffic in the second set of wavelengths to the pluggable module via the first module connector. The traffic distribution module also includes a plurality of second connectors configured to couple to a plurality of second module connectors of the pluggable module, receive the traffic in the second set of wavelengths from the pluggable module via the associated second module connectors, and forward the traffic in the second set to the plurality of secondary power splitters for distribution to particular ONUs in the PON.

8 Claims, 12 Drawing Sheets

U.S. PATENT DOCUMENTS

| | | | |
|---|---|---|---|
| 5,285,305 A | 2/1994 | Cohen et al. | |
| 5,321,541 A | 6/1994 | Cohen | 359/127 |
| 5,440,416 A | 8/1995 | Cohen et al. | 359/127 |
| 5,579,421 A | 11/1996 | Duvall et al. | |
| 5,694,234 A | 12/1997 | Darcie et al. | 359/125 |
| 5,926,298 A | 7/1999 | Li | 359/120 |
| 6,144,472 A | 11/2000 | Knox | 359/127 |
| 6,163,637 A | 12/2000 | Zirngibl | 385/37 |
| 6,411,410 B1 | 6/2002 | Wright et al. | |
| 6,498,876 B1 | 12/2002 | Liu et al. | 385/34 |
| 6,767,139 B2 | 7/2004 | Brun et al. | 385/84 |
| 7,245,829 B1 | 7/2007 | Sindile | |
| 7,389,048 B2 | 6/2008 | Kani et al. | |
| 2002/0061163 A1* | 5/2002 | Bartur et al. | 385/24 |
| 2002/0196491 A1 | 12/2002 | Deng et al. | |
| 2003/0002102 A1 | 1/2003 | Khalfallah et al. | |
| 2004/0001718 A1 | 1/2004 | Matthews et al. | |
| 2004/0131357 A1 | 7/2004 | Farmer et al. | |
| 2004/0175177 A1* | 9/2004 | Lee et al. | 398/72 |
| 2004/0184806 A1 | 9/2004 | Lee et al. | |
| 2005/0129404 A1 | 6/2005 | Kim et al. | 398/84 |
| 2005/0157982 A1* | 7/2005 | Shishido et al. | 385/37 |
| 2005/0175343 A1 | 8/2005 | Huang et al. | |
| 2005/0175344 A1 | 8/2005 | Huang et al. | |
| 2005/0180689 A1 | 8/2005 | Kozhevnikov et al. | |
| 2006/0056849 A1 | 3/2006 | Pamart et al. | |
| 2006/0153567 A1* | 7/2006 | Kim et al. | 398/72 |
| 2007/0092249 A1 | 4/2007 | Akasaka et al. | |
| 2007/0092250 A1 | 4/2007 | Bouda et al. | |
| 2007/0092251 A1 | 4/2007 | Bouda et al. | |
| 2007/0092252 A1 | 4/2007 | Bouda et al. | |
| 2007/0092253 A1 | 4/2007 | Bouda | |
| 2007/0092254 A1 | 4/2007 | Bouda | |
| 2007/0092255 A1 | 4/2007 | Bouda | |
| 2007/0166037 A1 | 7/2007 | Bouda | |
| 2007/0166043 A1 | 7/2007 | Bouda | |
| 2007/0183779 A1 | 8/2007 | Bouda | |
| 2007/0280690 A1 | 12/2007 | Bouda | |
| 2007/0280691 A1 | 12/2007 | Bouda | |

FOREIGN PATENT DOCUMENTS

| | | |
|---|---|---|
| EP | 1 434 375 A2 | 6/2004 |
| WO | WO 2007/047559 | 4/2007 |
| WO | WO 2007/081748 | 7/2007 |

OTHER PUBLICATIONS

ITU-T Telecommunication Standardization Sector of ITU-T, G.984.3, Series G: Study Period 2005-2008, Updated Revised Amendment 1, : "Amendment to Gigabit-Capable Passive Optical Network (G-PON): Transmission Convergence Layer Specification (2004)," pp. 1-39, May 16-27, 2005.
Park et al.; "Bidirectional Wavelength-Division-Multiplexing Self-Healing Passive Optical Network," Network Research Team, Telecommunications R&D Center, Samsung Electronics; 2005 Optical Society of America, 3 pages, Mar. 6, 2005.
Son et al.; "Survivable Network Architectures for WDM PON;" Korea Advanced Institute of Science and Technology; 2005 Optical Society of America, 3 Pages, Mar. 6, 2005.
Smith, Stephen, "Business Class Services Over a GPON Network," Fujitsu Network Communications; 10 pages, Mar. 5, 2006.
Wang et al.; "A Novel Centrally Controlled Protection Scheme for Traffic Restoration in WDM Passive Optical Networks;" IEEE Photonics Technology Letters, vol. 17, No. 3; Mar. 2005, pp. 717-719.
Suzuki et al.; "A Reliable Wide-Area WDM-PON Using Wavelength-Shifted Protection Scheme;" Access Network Service Systems Laboratories, NTT Corporation; 2 pages, Sep. 25, 2005.
ITU—Telecommunication Standardization Sector Study Group 15; "Recommendation G.983.5: A Broadband Optical Access System with Enhanced Survivability (for consent);" Editor, Recommendation G.983.5; 45 pages, Oct. 15-26, 2001.
Phillips et al.; "Redundancy Strategies for a High Splitting Optically Amplified Passive Optical Network," Journal of Lightwave Technology, vol. 19, No. 2; pp. 137-149, Feb. 2001.
Chan et al.; "A Novel Bidirectional Wavelength Division Multiplexed Passive Optical Network with 1:1 Protection;" Friday Morning, OFC, vol. 2; pp. 779-781, 2003.
Sun et al.; "A Novel Star-Ring Protection Architecture Scheme for WDM Passive Optical Access Networks;" Department of Information Engineering, The Chinese University of Hong Kong; 3 pages, Mar. 6, 2005.
Hirth, Ryan, "1 Gbps to 10 Gbps Migration," Teknovus, Access the Future, IEEE Meeting, Jul. 2006, San Diego, CA, pp. 1-7.
Diouf, Leopold, "Next Generation Access (NGA)," An Alcatel-Lucent Contribution to NGA, FSAN Meeting, Munich, Germany, Feb. 7-9, 2007, pp. 1-30, published on FSAN website Jan. 31, 2007, Published.
Handley et al., "A Comparison of WDM PON Architectures," Proceedings of the European Conference on Network and Optical Communications, Broadband Access and Technology. Amsterdam, IOS Press, NL, vol., part 1, pp. 141-147, Jan. 1, 1999.
International Searching Authority, "Notification of Transmittal of the International Search Report and the Written Opinion of the International Searching Authority, or the Declaration," (PCT Rule 44.1), International Application No. PCT/US2006/040318, mailed Feb. 14, 2007, 13 pages.
International Searching Authority, "Notification of Transmittal of the International Search Report and the Written Opinion of the International Searching Authority, or the Declaration," (PCT Rule 44.1), International Application No. PCT/US2006/040330, mailed Feb. 19, 2007, 13 pages.
International Searching Authority, "Notification of Transmittal of the International Search Report and the Written Opinion of the International Searching Authority, or the Declaration," (PCT Rule 44.1), International Application No. PCT/US2006/040605, 14 pages, mailed Feb. 14, 2007, 14 pages.
Bouda, "A Hybrid Passive Optical Network Using Shared Wavelengths," filed Feb. 3, 2006, 64 pps., 9 pps. drawings, U.S. Appl. No. 11/347,434, (0543).
Palacharla et al., "System and Method for Managing Network Components in a Hybrid Passive Optical Network," filed Oct. 25, 2006, 43 pps, 4 drawings U.S. Appl. No. 11/552,696, (0567).
Bouda, "System and Method for Transmitting Traffic in a Plurality of Passive Optical Networks," U.S. Appl. No. 11/627,809, filed Jan. 26, 2007, 35 pps., 5 pps. drawings, (0577).
Bouda, "System and Method for Managing Different Transmission Architectures in a Passive Optical Network," U.S. Appl. No. 11/627,793, 42 pps., 4 pps. drawings, (0580), Jan. 26, 2007.
Bouda, "System and Method for Distributing Traffic in an Optical Network," U.S. Appl. No. 11/426,879, filed Jun. 27, 2006, 43 pps., 5 pps. drawings, (0581).

Akasaka et al., "System and Method for Traffic Distribution in an Optical Network," U.S. Appl. No. 11/426,884, filed Jun. 27, 2006, 71 pps., 12 pps. drawings, (0582).

Bouda et al., "Method and System for Increasing Downstream Bandwidth in an Optical Network," filed Jan. 5, 2007, 42 pps., 10 pps. drawings, U.S. Appl. No. 11/620,144, (0590).

Bouda, "Distribution Node for an Optical Network," filed Jan. 4, 2007, 38 pps., 6 pps. drawings, U.S. Appl. No. 11/619,945, (0591).

Akasaka et al., "System and Method for Protecting an Optical Network," filed Dec. 11, 2006, 42 pps., 4 pps. drawings, U.S. Appl. No. 11/609,120, (0621).

Bouda et al., "System and Method for Extending Reach in a Passive Optical Network," filed Jan. 31, 2007, 51 pps, 5 pps. drawings, U.S. Appl. No. 11/669,657, (0630).

Bouda, "System and Method for Transmitting Optical Markers in a Passive Optical Network System," 52 pps., 5 pps. drawings, filed Jan. 31, 2007, U.S. Appl. No. 11/669,667, (0631).

Son, et al., *Bidirectional WDM Passive Optical Network for Simultaneous Transmission of Data and Digital Broadcast Video Service, Journal of Lightwave Technology*, vol. 21, No. 8, © 2003 IEEE, pp. 1723-1727, Aug. 2003.

Ching, et al., *Passive Optical Networks, Sharing the Fiber*, Merrill Lynch & Co. (27 pages), May 15, 2001.

Kuhlow, et al., *AWG-Based Device for a WDM Overlay PON in the 1.5-µm Bank, IEEE Photonics Technology Letters*, vol. 11, No. 2, © 1999 IEEE, pp. 218-220, Feb. 1999.

Feldman, et al., *An Evaluation of Architectures Incorporating Wavelength Division Multiplexing for Broad-Bank Fiber Access, Journal of Lightwave Technology*, vol. 16, No. 9, © 1998 IEEE, pp. 1546-1559, Sep. 1998.

Giles, et al., *Access PON Using Downstream 1550-nm WDM Routing and Upstream 1300-nm SCMA Combining Through a Fiber-Grating Router, IEEE Photonics Technology Letters*, vol. 8, No. 11, © 1996 IEEE, pp. 1549-1551, Nov. 1996.

Hilbk, et al., *High Capacity WDM Overlay on a Passive Optical Network, Electronics Letters*, vol. 32, No. 23, pp. 2162-2163, Nov. 7, 1996.

Inoue, et al., *Silica-based Arrayed-Waveguide Grating Circuit as Optical Splitter/Router, Electronics Letters*, vol. 31, No. 9, pp. 726-727. Apr. 27, 1995.

Kashima, *Upgrade of Passive Optical Subscriber Network, Journal of Lightwave Technology*, vol. 9, No. 1, © 1991 IEEE, pp. 113-120, Jan. 1991.

Lin, *Passive Optical Subscriber Loops with Multiaccess, Journal of Lightwave Technology*, vol. 7, No. 11, © 1989 IEEE, pp. 1769-1777, Nov. 1989.

(Mems)* Singlemode Fiber Optic Switch, FO5935, MOOG Components Group (2 pages), © 2005.

PON & FTTx Update, *Light Reading*, (11 pages), Aug. 8, 2005.

ITU-T Telecommunication Standardization Sector of ITU, G.984.1, Series G: Transmission Systems and Media, Digital Systems and Networks, Digital sections and digital line system—Optical line systems for local and access networks, *Gigabit-capable Passive Optical Networks (GPON): General Characteristics*. (20 pages), Mar. 2003.

ITU-T Telecommunication Standardization Sector of ITU, G.983.1, Series G: Transmission Systems and Media, Digital Systems and Networks, Digital sections and digital line system—Optical line systems for local and access networks, *Broadband Optical Access Systems Based on Passive Optical Networks* (117 pages), Jan. 2005.

ITU-T Telecommunication Standardization Sector of ITU, G.983.3, Series G: Transmission Systems and Media, Digital Systems and Networks, Digital sections and digital line system—Optical line systems for local and access networks, *A Broadband Optical Access Systems with Increased Service Capability by Wavelength Allocation* (52 pages), Mar. 2001.

Green, Paul E., Jr., *Fiber-to-the-Home White Paper*, 21 pgs., Feb. 21, 2003.

Bouda, *A Distribution Node for a Wavelength-Sharing Network*, U.S. Appl. No. 11/347,612, filed Feb. 3, 2006.

Bouda, et al., *Distribution Components for a Wavelength-Sharing Network*, U.S. Appl. No. 11/347,585, filed Feb. 3, 2006.

Bouda, et al., *Upgradeable Passive Optical Network*, U.S. Appl. No. 11/347,446, filed Feb. 3, 2006.

Bouda, *System and Method for Transmitting Upstream Traffic in an Optical Network*, U.S. Appl. No. 11/426,875, filed Jun. 27, 2006.

Bouda, *System and Method for Distributing Traffic in an Optical Network*, U.S. Appl. No. 11/426,879, filed Jun. 27, 2006.

International Searching Authority, "Notification of Transmittal of the International Search Report and the Written Opinion of the International Searching Authority, or the Declaration," (PCT Rule 44.1), International Application No. PCT/US2006/043188, mailed Mar. 14, 2007, 12 pages.

Langer et al, "Promising Evolution Paths for Passive Optical Access Networks," Proceedings of 2004 6th International Conference on Warsaw, Poland, Jul. 4, 2004 through Jul. 7, 2004, IEEE vol. 1, pp. 202-207.

International Searching Authority, "Notification of Transmittal of the International Search Report and the Written Opinion of the International Searching Authority, or the Declaration," (PCT Rule 44.1), International Application No. PCT/US2006/042224, mailed Mar. 5, 2007, 13 pages.

International Searching Authority, "Notification of Transmittal of the International Search Report and the Written Opinion of the International Searching Authority, or the Declaration," (PCT Rule 44.1), International Application No. PCT/US2006/040597, mailed Mar. 5, 2007, 15 pages.

International Searching Authority, "Notification of Transmittal of the International Search Report and the Written Opinion of the International Searching Authority, or the Declaration," (PCT Rule 44.1), International Application No. PCT/US2006/042220, mailed Mar. 12, 2007, 12 pages.

Zang et al., "A Review of Routing and Wavelength Assignment Approaches for Wavelength-Routed Optical WDM Networks," Optical Networks Magazine, SPIE, Bellingham, WA, US, vol. 1, No. 1, Jan. 2000, pp. 47-60.

Bouda, "System and Method for Protecting an Optical Network," U.S. Appl. No. 11/680,186, filed Feb. 28, 2007, 35 pps., 6 pps. drawings, (0579).

International Searching Authority, "Notification of Transmittal of the International Search Report and the Written Opinion of the International Searching Authority, or the Declaration," (PCT Rule 44.1), International Application No. PCT/US2007/000184, mailed Jul. 27, 2007, 13 pages.

Asatani et al., "A Field Trial of Fiber Optic Subscriber Loop Systems Utilizing Wavelength-Division Multiplexers," IEEE Transactions on Communications, IEEE Service Center, Piscataway, NJ, vol. COM-30, No. 9, Sep. 1982, pp. 2172-2184.

Cheng et al., "Integrated a Hybrid CATV/GPON Transport System Based on 1.31/1.49/1.55um WDM Transceiver Module," 2005 Quantum Electronics and Laser Science Conference, pp. 1678-1680, 2005.

Palacharla et al.., System and Method for Managing Communication in a Hybrid Passive Optical Network, filed May 2, 2007, U.S. Appl. No. 11/743,311, 50 pages, 6 pages of drawings.

International Searching Authority, "Notification of Transmittal of the International Search Report and the Written Opinion of the International Searching Authority, or the Declaration," (PCT Rule 44.1), International Application No. PCT/US2007/000189, mailed Jul. 18, 2007, 12 pages.

International Searching Authority, "Notification of Transmittal of the International Search Report and the Written Opinion of the International Searching Authority, or the Declaration," (PCT Rule 44.1), International Application No. PCT/US2007/002955, mailed Jun. 28, 2007, 11 pages.

Wagner et al., "Technology and System Issues for a WDM-Based Fiber Loop Architecture," Journal of Lightwave Technology, IEEE Service Center, New York, NY, vol. 7, No. 11, Nov. 1, 1989, pp. 1759-1768.

Frigo et al., "A Wavelength-Division Multiplexed Passive Optical Network with Cost-Shared Components," IEEE Photonics Technology Letters, IEEE Service Center, Piscataway, NJ, vol. 4, No. 11, Nov. 1, 1994, pp. 1365-1367.

Oakley, "An Economic Way to See in the Broadband Dawn," Institute of Electrical and Electronics Engineers, Communications for the Information Age, Proceedings of the Global Telecommunications Conference and Exhibition (Globecom), New York, IEEE, vol. 3, Nov. 28, 1988, pp. 1574-1578.

International Searching Authority, "Notification of Transmittal of the International Search Report and the Written Opinion of the International Searching Authority, or the Declaration," (PCT Rule 44.1), International Application No. PCT/US2007/002851, mailed Aug. 21, 2007, 11 pages.

European Patent Office, European Search Report and Office Action, Application No. 07010686-9-2415, mailed Aug. 21, 2007, 14 pages.

Son et al., "Bidirectional Passive Optical Network for the Transmission of WDM Channels with Digital Broadcast Video Signals," Optical Society of America/Institute of Electrical and Electronics Engineers, Optical Fiber Communication Conference and Exhibit (OFC). Technical Digest, Post Conference Digest, Mar. 17-22, 2002, Trends in Optical and Photonic Series, pp. 767-768.

* cited by examiner

SYSTEM AND METHOD FOR TRAFFIC DISTRIBUTION IN AN OPTICAL NETWORK

CROSS-REFERENCE TO RELATED APPLICATIONS

This application is a Continuation-in-Part of application Ser. No. 11/347,434 filed Feb. 3, 2006 now U.S. Pat. No. 7,546,036 by Bouda, et al., and entitled Hybrid Passive Optical Network Using Shared Wavelengths, which claims benefit under 35 U.S.C. §119(e) of U.S. Provisional Application Ser. No. 60/729,447 filed Oct. 20, 2005 by Bouda, et al. and entitled Passive Optical Network Using Shared Wavelengths; and U.S. Provisional Application Ser. No. 60/756,925 filed Jan. 6, 2006 by Bouda, et al. and entitled Hybrid Passive Optical Network Components. This application also claims benefit under 35 U.S.C. §119(e) of U.S. Provisional Application Ser. No. 60/729,447 filed Oct. 20, 2005 by Bouda, et al. and entitled Passive Optical Network Using Shared Wavelengths; U.S. Provisional Application Ser. No. 60/756,925 filed Jan. 6, 2006 by Bouda, et al. and entitled Hybrid Passive Optical Network Components, and U.S. Provisional Application Ser. No. 60/803,800 filed Jun. 2, 2006 by Akasaka, et al., and entitled System and Method for Traffic Distribution in an Optical Network.

TECHNICAL FIELD

The present invention relates generally to communication systems and, more particularly, to a system and method for traffic distribution in an optical network.

BACKGROUND

In recent years, a bottlenecking of communication networks has occurred in the portion of the network known as the access network. Bandwidth on longhaul optical networks has increased sharply through new technologies such as WDM and transmission of traffic at greater bit rates. Metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the internet.

Power-splitting passive optical networks (PSPONs) offer one solution to the bottleneck issue. PSPONs refer to typical access networks in which an optical line terminal (OLT) at the carrier's central office transmits traffic over one or two downstream wavelengths for broadcast to optical network units (ONUs). In the upstream direction, ONUs typically time-share transmission of traffic in one wavelength. An ONU refers to a form of access node that converts optical signals transmitted via fiber to electrical signals that can be transmitted to individual subscribers and vice versa. PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (KB/s) and 1.5 megabits per second (MB/s). Conversely, Broadband PONs (BPONs), which are example PSPONs, are currently being deployed to provide hundreds of megabits per second capacity shared by thirty-two users. Gigabit PONs (GPONs), another example of a PSPON, typically operate at speeds of up to 2.5 gigabits per second (GB/s) by using more powerful transmitters, providing even greater bandwidth. Other PSPONs include, for example, asynchronous transfer mode PONs (APONs) and gigabit Ethernet PONs (GE-PONs).

Although PSPONs may offer much greater bandwidth than typical access networks such as DSL networks, bandwidth requirements are projected to exceed even the increased capacity offered by typical PSPONs. For example, some streaming video and online gaming applications presently require bit rates of approximately one to ten MB/s, and some IP high definition television and video-on-demand systems presently require bit rates of approximately twenty MB/s. Future demands for bandwidth are projected to be even greater. Thus, a need exists for an access network that provides even greater bandwidth.

Another solution to the present bottlenecking issue that would also satisfy demand for bandwidth for many years to come is using wavelength division multiplexing passive optical networks (WDMPONs). These networks comprise access networks in which each ONU receives and transmits traffic over a dedicated downstream and upstream wavelength, respectively. By transmitting traffic over dedicated wavelengths, WDMPONs dramatically increase network capacity over existing networks (including typical PSPONs). However, WDMPONs tend to be very expensive compared to PSPONs, the technological risks of deployment of WDMPONs are very high, and WDMPONs provide much more bandwidth than is presently demanded. Thus, a need exists for an upgrade solution from PSPON that is more cost-effective than WDMPON.

SUMMARY

In accordance with the teachings of the present invention, a system and method for traffic distribution in an optical network is provided. In a particular embodiment, a traffic distribution module in a passive optical network (PON), includes a filter configured to receive downstream traffic in a first set of one or more wavelengths and a second set of one or more wavelengths from an optical line terminal (OLT), direct the traffic in the first set of wavelengths to a primary power splitter, and direct the traffic in the second set of wavelengths to a first connector. The traffic distribution module also includes a primary power splitter and a plurality of secondary power splitters. The primary power splitter is configured to receive the traffic in the first set of wavelengths and distribute the traffic in the first set to the plurality of secondary power splitters coupled to the primary power splitter such that optical network units (ONUs) in the PON receive the traffic in the first set of wavelengths. The traffic distribution module also includes a first connector configured to couple to a first module connector of a pluggable module and to forward the traffic in the second set of wavelengths to the pluggable module via the first module connector. The traffic distribution module also includes a plurality of second connectors configured to couple to a plurality of second module connectors of the pluggable module, receive the traffic in the second set of wavelengths from the pluggable module via the associated second module connectors, and forward the traffic in the second set to the plurality of secondary power splitters for distribution to particular ONUs in the PON.

Technical advantages of one or more embodiments of the present invention include providing an upgradeable RN that allows network operators to tailor increases in capacity more closely to demand for that capacity along the upgrade path from a PSPON to a WDMPON. Another technical advantage of particular embodiments may include, for example, efficiently reusing broadband PSPON wavelengths as routed WDM wavelengths after an upgrade to an HPON. For example, in example GPONs, the 1490 nanometer (nm) broadcast downstream wavelength may be reused as a routed WDM downstream wavelength after an upgrade to an HPON. Another technical advantage of particular embodiments may include reusing PSPON components in an upgrade to an HPON, including, for example, reusing one or more PSPON transmitters. In particular embodiments, HPON upgrades at the distribution node may be implemented by exchanging pluggable modules, allowing for easy upgradeability. Different types of pluggable modules may correspond to different types of upgrades.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
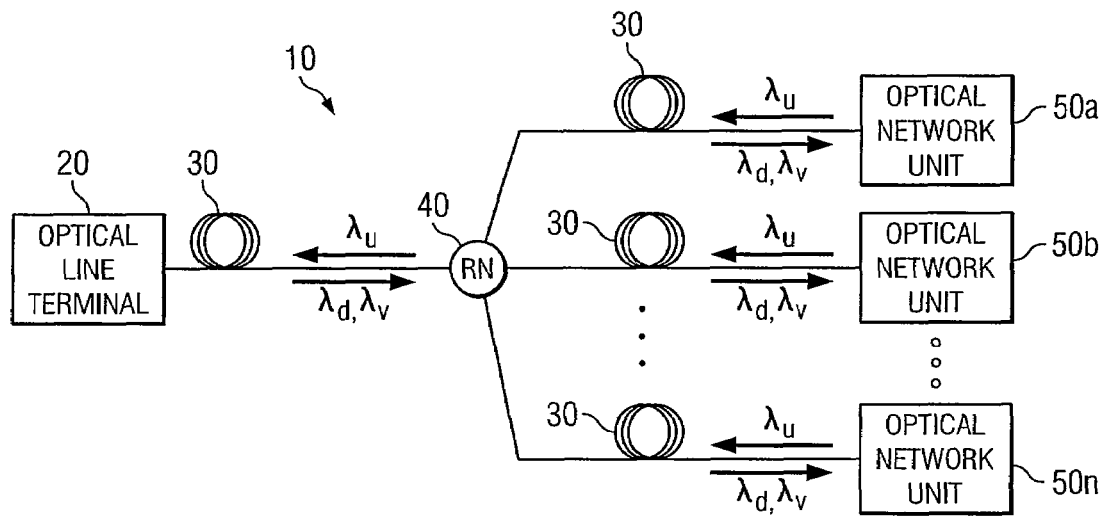
FIG. 1 is a diagram illustrating an example power splitting PON (PSPON)

FIG. 1 is a diagram illustrating an example Power Splitting Passive Optical Network (PSPON) 10. Typically, PSPONs have been employed to address the bottlenecking of communications networks in the portion of the network known as the access network. In recent years, bandwidth on longhaul optical networks has increased sharply through new technologies such as wavelength division multiplexing (WDM) and transmission of traffic at greater bit rates. In addition, metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the internet.

PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (KB/s) and 1.5 megabits per second (MB/s). Conversely, broadband PONs (BPONs) are currently being deployed to provide hundreds of megabits per second capacity shared by thirty-two users. Gigabit PONs (GPONs), which typically operate at speeds of up to 2.5 gigabits per second (GB/s) by using more powerful transmitters, provide even greater bandwidth.

Referring back to PSPON 10 of FIG. 1, PSPON 10 includes an Optical Line Terminal (OLT) 20, optical fiber 30, a Remote Node (RN) 40, and Optical Network Units (ONUs) 50. PSPON 10 refers to typical access networks in which an optical line terminal (OLT) at the carrier's central office transmits traffic over one or two downstream wavelengths for broadcast to optical network units (ONUs). PSPON 10 may be an asynchronous transfer mode PON (APON), a BPON, a GPON, a gigabit Ethernet PON (GEPON), or any other suitable PSPON. A feature common to all PSPONs 10 is that the outside fiber plant is completely passive. Downstream signals transmitted by the OLT are passively distributed by the RN to downstream ONUs coupled to the RN through branches of fiber, where each ONU is coupled to the end of a particular branch. Upstream signals transmitted by the ONUs are also passively forwarded to the OLT by the RN.

OLT 20 (which may be an example of an upstream terminal) may reside at the carrier's central office (where it may be coupled to a larger communication network) and includes a transmitter operable to transmit traffic in a downstream wavelength, such as $\lambda_d$, for broadcast to all ONUs 50, which may reside at or near customer sites. OLT 20 may also include a transmitter operable to transmit traffic in a second downstream wavelength $\lambda_v$ (which may be added to $\lambda_d$) for broadcast to all ONUs 50. As an example, in typical GPONs, $\lambda_v$ may carry analog video traffic. Alternatively, $\lambda_v$ may carry digital data traffic. OLT 20 also includes a receiver operable to receive traffic from all ONUs 50 in a time-shared upstream wavelength, $\lambda_u$. In typical PSPONs, downstream traffic in $\lambda_d$ and $\lambda_v$ is transmitted at a greater bit rate than is traffic in $\lambda_u$, as PSPONs typically provide lower upstream bandwidth than downstream bandwidth. It should be noted that "downstream" traffic refers to traffic traveling in the direction from the OLT (or upstream terminal) to the ONUs (or downstream terminals), and "upstream" traffic refers to traffic traveling in the direction from the ONUs (or downstream terminals) to the OLT (or upstream terminal). It should further be noted that $\lambda_d$ may include the band centered around 1490 nm, $\lambda_v$ may include the band centered around 1550 nm, and $\lambda_u$ may include the band centered around 1311 nm in particular PSPONs.

Optical fiber 30 may include any suitable fiber to carry upstream and downstream traffic. In certain PSPONs 10, optical fiber 30 may comprise, for example, bidirectional optical fiber. In other PSPONs 10, optical fiber 30 may comprise two distinct fibers. RN 40 of PSPON 10 (which may also generally be referred to as a distribution node) comprises any suitable power splitter, such as an optical coupler, and connects OLT 20 to ONUs 50. RN 40 is located in any suitable location and is operable to split a downstream signal such that each ONU 50 receives a copy of the downstream signal. Due to the split and other possible power losses, each copy forwarded to an ONU has less than 1/N of the power of the downstream signal received by RN 40, where N refers to the number of ONUs 50. In addition to splitting downstream signals, RN 40 is also operable to combine into one signal upstream, time-shared signals transmitted by ONUs 50. RN 40 is operable to forward the upstream signal to OLT 20.

ONUs 50 (which may be examples of downstream terminals) may include any suitable optical network unit or optical network terminal (ONT) and generally refer to a form of access node that converts optical signals transmitted via fiber to electrical signals that can be transmitted to individual subscribers. Subscribers may include residential and/or commercial customers. Typically, PONs 10 have thirty-two ONUs 50 per OLT 20, and thus, many example PONs may be described as including this number of ONUs. However, any suitable number of ONUs per OLT may be provided. ONUs 50 may include triplexers that comprise two receivers to receive downstream traffic (one for traffic in $\lambda_d$ and the other for traffic in $\lambda_v$) and one transmitter to transmit upstream traffic in $\lambda_u$. The transmission rate of the ONU transmitter is typically less than the transmission rate of the OLT transmitter (due to less demand for upstream capacity than for downstream capacity). Each ONU 50 is operable to process its designated downstream traffic and to transmit upstream traffic according to an appropriate time-sharing protocol (such that the traffic transmitted by one ONU in $\lambda_u$ does not collide with the traffic of other ONUs in $\lambda_u$).

In operation, the OLT 20 of a typical PSPON 10 transmits downstream traffic destined for one or more of ONUs 50 in $\lambda_d$. OLT 20 may also transmit downstream analog video traffic for broadcast to ONUs 50 in $\lambda_v$. Traffic in wavelengths $\lambda_d$ and $\lambda_v$ is combined at OLT 20 and travels over optical fiber 30 to RN 40. RN 40 splits the downstream traffic into a suitable number of copies and forwards each copy to a corresponding ONU. Each ONU receives a copy of the downstream traffic in $\lambda_d$ and $\lambda_v$ and processes the signal. Suitable addressing schemes may be used to identify which traffic is destined for which ONU 50. Each ONU 50 may also transmit upstream traffic in $\lambda_u$ along fiber 30 according to a suitable time-sharing protocol (such that upstream traffic does not collide). RN 40 receives the upstream traffic from each ONU 50 and combines the traffic from each ONU 50 into one signal. RN 40 forwards the signal over fiber 30 to OLT 20. OLT 20 receives the signal and processes it.

Although PSPONs may offer much greater bandwidth than typical access networks such as DSL networks, bandwidth requirements are projected to exceed even the increased capacity offered by typical PSPONs. For example, some streaming video and online gaming applications presently require bit rates of approximately one to ten MB/s, and some IP high definition television and video-on-demand systems presently require bit rates of approximately twenty MB/s. Future demands for bandwidth are projected to be even greater. In the past, network operators have met increased demand by increasing the transmission rate of transmitters, such as, for example, by upgrading from BPONs to GPONs. However, a switch to a wavelength division multiplexing PON (WDMPON), in which each ONU would receive and transmit traffic over a dedicated downstream and upstream wavelength, respectively, would dramatically increase network capacity and satisfy the demand for bandwidth for many years to come.

Figure 2:
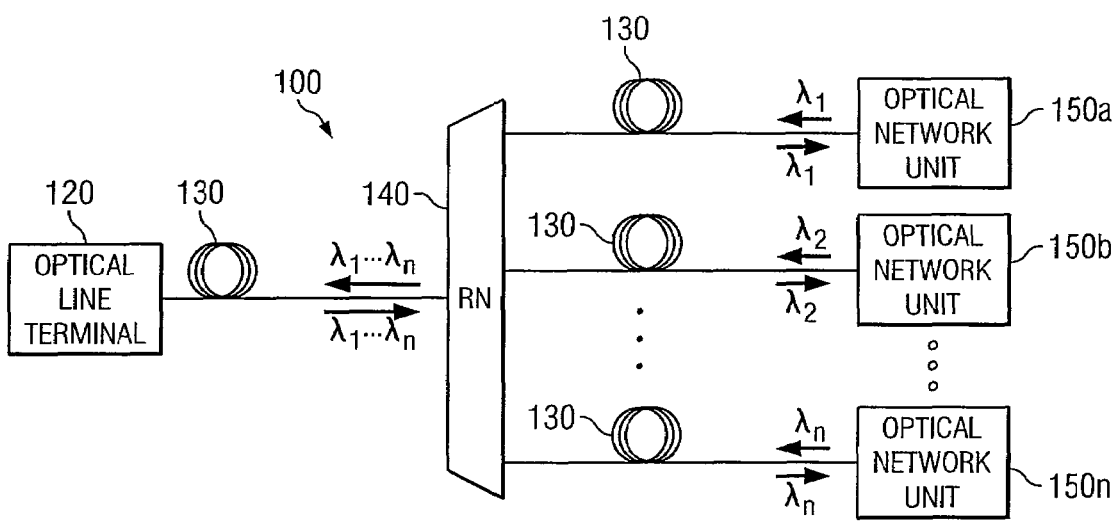
FIG. 2 is a diagram illustrating an example WDMPON.

FIG. 2 is a diagram illustrating an example WDMPON 100. WDMPON 100 may include any suitable WDMPON (also referred to as WPON) or Dense WDMPON (DWDMPON). WDMPON 100 includes OLT 120, optical fiber 130, RN 140, and ONUs 150. Common features of WDMPONs include dedicating at least one upstream and one downstream wavelength for each ONU. Thus, WDMPONs are operable to transmit downstream traffic over multiple, dedicated wavelengths from an OLT, each wavelength corresponding to a particular ONU. In addition, each ONU is operable to transmit upstream traffic over a dedicated wavelength, separate from the wavelengths used by the other ONUs 150. Thus, the upstream and downstream bandwidth of WDMPON 100 is N times greater than the bandwidth of a PSPON, where N equals the number of dedicated wavelengths over which traffic is carried in each direction.

Referring back to FIG. 2, OLT 120 of example WDMPON 100 may reside at the carrier's central office and includes multiple transmitters (equal to the number of ONUs 150), each operable to transmit a dedicated downstream wavelength, one of $\lambda_1$-$\lambda_n$, carrying traffic for a corresponding ONU 150. OLT 120 also includes multiple receivers (equal to the number of ONUs 150), each operable to receive a dedicated upstream wavelength, one of $\lambda_1$-$\lambda_n$, carrying traffic from a corresponding ONU 150. OLT 120 also includes a multiplexer operable to multiplex the downstream wavelengths transmitted by the transmitters of OLT 120 and demultiplex the upstream signal (comprising traffic in multiple wavelengths) that OLT 120 receives from ONUs 150. After demultiplexing the signal, the multiplexer is operable to forward the traffic in each wavelength to a corresponding receiver in OLT 120. It should be noted that $\lambda_1$-$\lambda_n$ in the downstream direction may (or may not) be transmitted at the same wavelengths as $\lambda_1$-$\lambda_n$ traveling upstream (despite having similar designation for simplicity of this discussion).

Optical fiber 130 may include any suitable fiber and is operable to carry upstream and downstream traffic. In certain WDMPONs 100, optical fiber 130 may comprise, for example, bidirectional optical fiber. In other WDMPONs 100, optical fiber 130 may comprise two distinct fibers. RN 140 of WDMPON 100 comprises any suitable multiplexer and connects OLT 120 to ONUs 150. RN 140 is located in any suitable location and has one port to receive a downstream signal comprising multiple wavelengths from OLT 120 and multiple ports (equal to the number of ONUs 150) to forward traffic in each wavelength to a corresponding ONU. RN 140 is operable to demultiplex a downstream signal such that each ONU 150 receives traffic over its dedicated downstream wavelength, one of $\lambda_1$-$\lambda_n$. RN 140 is also operable to multiplex upstream traffic carried over $\lambda_1$-$\lambda_n$ into a single upstream signal, the traffic in each wavelength corresponding to one ONU 150. RN 140 is operable to forward the upstream signal to OLT 120.

ONUs 150 may include any suitable optical network unit or ONT and may serve residential and/or commercial customers. Each ONU 150 comprises one receiver to receive downstream traffic over its dedicated downstream wavelength from OLT 120. Each ONU 150 also comprises one transmitter to transmit upstream traffic over its dedicated upstream wavelength. Each ONU 150 may be capable of transmitting and receiving traffic in any wavelength used in WDMPON 100 such that the wavelengths assigned to the various ONUs may be changed without having to change the transmitting and receiving components in the ONUs. An ONU capable of operating in this fashion is typically referred to as a "colorless" ONU.

In operation, each transmitter in OLT 120 transmits downstream traffic for a corresponding ONU 150 over a dedicated wavelength, a corresponding one of $\lambda_1$-$\lambda_n$. The downstream wavelengths are multiplexed at OLT 120 into one signal, and the signal travels over optical fiber 130 to RN 140. RN 140 receives the signal and demultiplexes the signal into its constituent wavelengths, forwarding the traffic in each wavelength to a corresponding ONU 150. Each ONU 150 receives traffic over the associated wavelength and processes the traffic. Each ONU 150 may also transmit upstream traffic over a dedicated wavelength, one of $\lambda_1$-$\lambda_n$, along fiber 130. RN 140 receives upstream traffic from all of the ONUs 150 carried over these dedicated wavelengths and multiplexes the traffic from all of the ONUs 150 into one signal. RN 140 forwards the signal over fiber 130 to OLT 120. OLT 120 receives the signal and demultiplexes it into its constituent wavelengths. The demultiplexer of OLT 120 forwards the traffic in each wavelength to a corresponding receiver, and OLT 120 processes the traffic.

As is easily observed in the WDMPON 100 of FIG. 2, WDMPONs dramatically increase bandwidth at the access network by multiplying network capacity by the number of wavelengths carried. However, the increase in bandwidth using WDMPONs comes at a significant cost. For example, WDMPONs require highly stable WDM components to distribute narrowly spaced dedicated wavelengths (or channels) from the OLT to each ONU and from each ONU to the OLT. For example, the multiplexer/demultiplexer at RN 140 and the receivers and transmitter at each ONU 150 must all be precisely tuned. In practice, the density of the channels requires wavelength stabilized transmitters and temperature insensitive multiplexers, both of which add significantly to the cost of the network. Many WDMPON components (including colorless ONUs) are also expensive and as-of-now unproven technologies whose reliability has not been determined. Thus, according to some estimates, implementing a WDMPON may cost two to five times as much as a GPON and WDMPON may be unreliable.

In addition to these high costs, replacing current networks with WDMPONs would also inefficiently increase network capacity beyond present needs. In fact, WDMPONs are expected to exceed demand for many years. Thus, many network operators would prefer to make gradual upgrades from existing networks, such that increases in bandwidth (and thus the cost of such increases) correspond more closely with increases in consumer demand. These operators may eventually upgrade to a WDMPON after one or more intermediary upgrades, thereby incurring the cost of WDMPON bandwidth over a greater period of time and according to consumer demand. Thus, a need exists for a hybrid PON (HPON) that offers a simple and efficient upgrade from existing PSPONs and that may easily and efficiently be upgraded (to, for example, a WDMPON).

Figure 3:
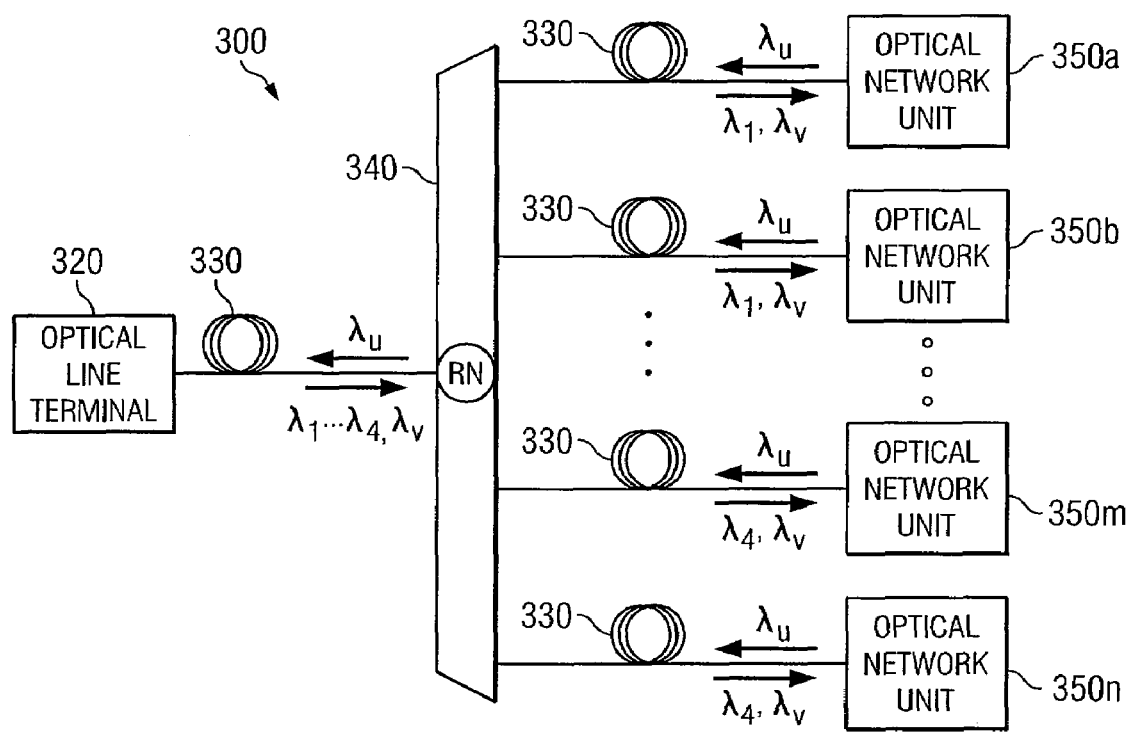
FIG. 3 is a diagram illustrating an example Wavelength Shared Hybrid PON (WS-HPON)

FIG. 3 is a diagram illustrating an example Wavelength Shared Hybrid PON (WS-HPON) 300. Example WS-HPON 300 comprises OLT 320, optical fiber 330, RN 340, and ONUs 350. Example WS-HPON 300, a hybrid between a PSPON and a WDMPON, provides a cost-efficient upgrade solution for many network operators. Example WS-HPON 300 provides greater downstream capacity cost-efficiently by having groups of two or more ONUs 350 share downstream WDM wavelengths, thus reducing the need for densely multiplexed wavelengths and the need for highly stable multiplexers and transceivers. It should be noted that an HPON generally refers to any suitable PON that is not a full WDM-PON but that is operable to route downstream traffic in particular wavelengths to particular ONUs (and to transmit upstream traffic in any suitable manner). An HPON may include both an HPON that transmits downstream traffic in a plurality of wavelengths each shared by a group of wavelength-sharing ONUs (a WS-HPON) and an HPON that transmits downstream traffic in a unique wavelength for each ONU (retaining PSPON characteristics in the upstream direction).

In the illustrated example, ONUs 350a-350n may share $\lambda_1$-$\lambda_4$. Traffic in $\lambda_v$ is broadcast to all ONUs. It should be noted that any suitable number of ONUs may be associated with one OLT. Additionally, any suitable number of ONUs may share one or more wavelengths in a WS-HPON. Using shared wavelengths in WS-HPON permits the use of less costly optics components (such as, for example, low-cost CWDM optics), allowing for an upgrade in capacity at a lower cost than other HPONs or WDMPON.

For example, sharing downstream wavelengths in WS-HPON 300 reduces the cost and stability requirements of the multiplexer and transmitter/receiver components in the network. Due to the sharing of wavelengths, the spacing between WDM wavelengths may be increased to relax the specifications of wavelength selective elements and to relax the requirements for transmitter wavelength stability and temperature stability of passive components. By using less expensive components to provide a desired increase in downstream bandwidth, WS-HPON 300 is a much more attractive upgrade solution for many network operators than are other HPONs. In addition, WS-HPON 300 is also upgradeable to WDMPON, allowing migration to WDMPON if and when there is sufficient demand to justify the cost for the increase in bandwidth.

OLT 320 of WS-HPON 300 (which may be an example of an upstream terminal) may reside at the carrier's central office and comprises four transmitters operable to transmit downstream traffic over $\lambda_1$-$\lambda_4$, which are to be shared by groups of ONUs 350. OLT 320 may also comprise an additional transmitter operable to transmit an analog video signal in $\lambda_v$ for broadcast to all ONUs 350. OLT 320 may also comprise a multiplexer operable to multiplex the wavelengths transmitted by the transmitters of OLT 320. OLT 320 may also comprise a receiver operable to receive upstream traffic in wavelength $\lambda_u$, which is time-shared by ONUs 350. It should be noted that although the illustrated embodiment shows only four downstream wavelengths to be shared by ONUs 350, any suitable number of downstream wavelengths may be transmitted at OLT 320 and shared by groups of ONUs 350. In addition, any suitable number of downstream wavelengths may be transmitted at OLT 320 and the traffic in these wavelengths broadcast to all ONUs 350 (and not just the traffic in $\lambda_v$, as illustrated). It should be further noted that traffic in any suitable number of upstream wavelengths may be received at OLT 320 and an upstream wavelength need not be time-shared by all ONUs (for example, a separate upstream wavelength may be time-shared by each group of downstream, wavelength-sharing ONUs).

Optical fiber 330 may comprise any suitable fiber to carry upstream and downstream traffic. In certain WS-HPONs 300, optical fiber 330 may comprise, for example, bidirectional fiber. In other WS-HPONs 300, optical fiber 330 may comprise two distinct fibers.

RN 340 of WS-HPON 300 may comprise a multiplexer and a power splitter. The multiplexer is operable to demultiplex downstream wavelengths $\lambda_1$-$\lambda_4$ and forward traffic in each of these wavelengths to a corresponding group of wavelength-sharing ONUs 350. The power splitter is operable to receive and split traffic in downstream wavelength $\lambda_v$ (if applicable) for broadcast to all ONUs 350. With regard to upstream traffic, the power splitter of RN 340 is also operable to receive and combine traffic in time-shared $\lambda_u$ from ONUs 350 into one signal. RN 340 is further operable to forward the upstream signal to OLT 320. It should be noted that although RN 340 is referred to as a remote node, "remote" refers to RN 340 being communicatively coupled to OLT 320 and ONUs 350 in any suitable spatial arrangement. A remote node may also generally be referred to as a distribution node.

ONUs 350 (which may be examples of downstream terminals) may comprise any suitable optical network unit or ONT and may serve residential and/or commercial customers. There may be any suitable number of ONUs. Each ONU 350 may comprise one receiver to receive traffic over a shared wavelength, one of $\lambda_1$-$\lambda_4$, and one receiver to receive traffic over $\lambda_v$ (if applicable). Each ONU 350 may also comprise one transmitter to transmit upstream traffic over time-shared $\lambda_u$. Each ONU 350 may thus comprise a triplexer.

In operation, the transmitters in OLT 320 transmit downstream traffic over $\lambda_1$-$\lambda_4$, which are to be shared by groups of ONUs 350, and (in certain cases) one transmitter in OLT 320 transmits downstream traffic to be broadcast to all ONUs 350 over $\lambda_v$. Traffic in wavelengths $\lambda_1$-$\lambda_4$ and $\lambda_v$ is multiplexed at OLT 320 into one signal, and the signal travels over optical fiber 330 to RN 340. RN 340 filters the traffic in $\lambda_v$ out of the signal and forwards the traffic to the power splitter where it is split for broadcast to all ONUs 350. At the multiplexer, RN 340 demultiplexes the signal comprising the traffic in the remaining wavelengths ($\lambda_1$-$\lambda_4$) and forwards the traffic in each wavelength, one of $\lambda_1$-$\lambda_4$, to its corresponding group of wavelength-sharing ONUs 350. Each ONU 350 receives traffic over one or more of the wavelengths that it shares with other ONUs 350 and processes the traffic (according to a suitable protocol). Each ONU 350 may also receive and process traffic over $\lambda_v$. In the upstream direction, each ONU 350 time-shares use of $\lambda_u$ according to a suitable protocol. RN 340 receives upstream traffic carried over time-shared $\lambda_u$ from each of the ONUs 350 and combines the traffic into one signal using the power splitter. RN 340 forwards the combined signal over fiber 230 to OLT 220. OLT 220 receives the signal at its receiver and processes the traffic.

Modifications, additions, or omissions may be made to the WS-HPON 300 described without departing from the scope of the invention. The components of the WS-HPON 300 described may be integrated or separated according to particular needs. Moreover, the operations of the WS-HPON 300 described may be performed by more, fewer, or other components.

Referring back to the discussion of PSPONs, PSPONs may transmit downstream traffic over two wavelengths $\lambda_d$ and $\lambda_v$, and upstream traffic over time-shared wavelength $\lambda_u$. Many typical PSPONs are not easily upgradeable to an HPON. Upgrades of typical PSPONs to HPONs require a disruption in service. For example, in existing PSPONs, fiber cuts are required to add or modify components, disrupting service in existing networks. Thus, a need exists for an easily upgradeable PSPON.

Figure 4:
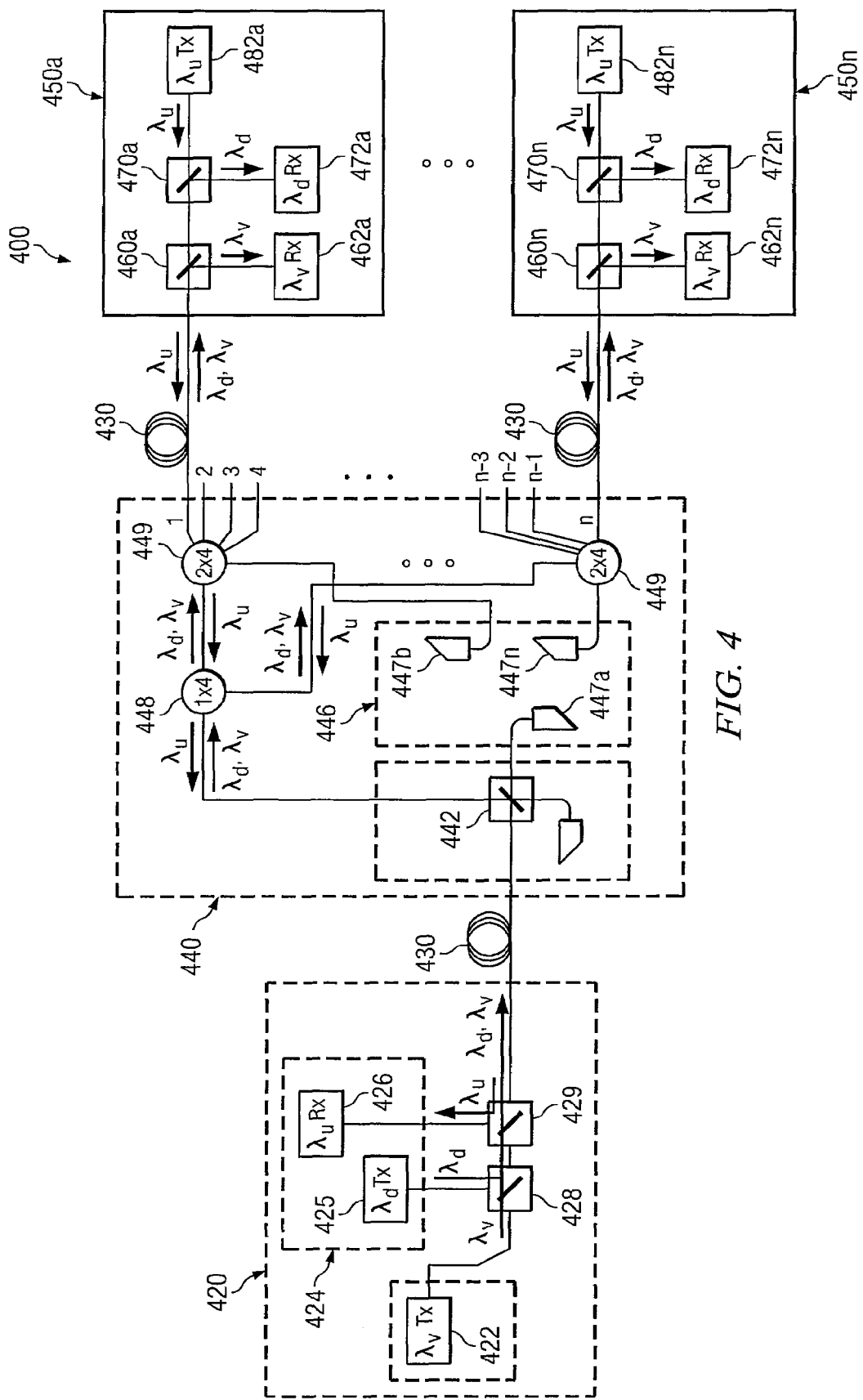
FIG. 4 is a diagram illustrating an example upgradeable PSPON.

FIG. 4 is a diagram illustrating an example upgradeable PSPON 400. Example PSPON 400 comprises OLT 420, optical fiber 430, RN 440, and ONUs 450. The upgradeability of upgradeable PSPON 400 may be provided for any PSPON such as those described above in conjunction with PSPON 10 of FIG. 1

OLT 420 of example upgradeable PSPON 400 (which may be an example of an upstream terminal) comprises a transmitter 422, transceiver 424 comprising transmitter 425 and receiver 426, and filters 428 and 429. Transmitter 422 may comprise any suitable transmitter and is operable to transmit traffic over wavelength $\lambda_v$. Transmitter 422 of typical PSPONs may transmit analog video traffic (although transmitter 422 may alternatively transmit digital data traffic). Transmitter 425 of transceiver 424 may comprise any suitable transmitter operable to transmit traffic over wavelength $\lambda_d$. Transmitter 425 of typical PSPONs may transmit digital data traffic. Transmitters 422 and 425 may transmit at any suitable bit rate. Receiver 426 of transceiver 424 may comprise any suitable receiver operable to receive upstream traffic from ONUs 450 carried over $\lambda_u$. Filter 428 comprises any suitable filter operable to pass the traffic in $\lambda_v$ and direct the traffic in $\lambda_d$ to RN 440. The traffic in $\lambda_d$ and $\lambda_v$ may also be combined into one signal at filter 428. Filter 429 comprises any suitable filter operable to pass the traffic in downstream wavelengths $\lambda_d$ and $\lambda_v$ to RN 440 and direct the traffic in upstream wavelength $\lambda_u$ to receiver 426.

Optical fiber 430 may comprise any suitable fiber to carry upstream and downstream traffic. In particular example upgradeable PSPON 400, optical fiber 430 may comprise bidirectional optical fiber. Alternatively, optical fiber 430 may comprise one fiber for downstream traffic and one fiber for upstream traffic.

RN 440 comprises a filter 442, a lead termination section 446, a primary power splitter 448, and secondary power splitters 449. RN 440 is configured to be easily upgraded to implement a WS-HPON and, eventually, a WDMPON. Filter 442 comprises any suitable filter and may include, for example, a band splitting filter. Filter 442 is operable to direct the traffic in downstream wavelengths that are to be split and broadcast by primary power splitter 448 and pass the traffic in downstream wavelengths that are to be demultiplexed (once the system is upgraded to a WS-HPON). Filter 442 is also operable to direct the traffic in upstream wavelengths to OLT 420. Before an upgrade from a PSPON, filter 442 directs the traffic in $\lambda_d$ and $\lambda_v$ to primary power splitter 448 for broadcast, and directs the traffic in $\lambda_u$ from primary power splitter 448 to OLT 420. Filter 442 may be coupled to a termination point that may terminate the traffic in wavelengths forwarded to it by filter 442 (although the termination point may be internal to filter 442 in alternate example networks). Although the illustrated example includes only one filter 442, example upgradeable PSPONs may comprise any suitable number of filters (and optional switches) to seamlessly upgrade the network.

Lead termination section 446 of RN 440 allows for an easy upgrade of network 400 by inserting a wavelength router such as a multiplexer for performing WDM. Lead termination section 446 comprises a plurality of fiber leads. One input fiber lead 447a is coupled to filter 442, and multiple output fiber leads 447b-447n are coupled to corresponding secondary power splitters 449. Before an upgrade, leads 447a-447n of lead termination section 446 may be configured such that they terminate any signal that they may receive. After an upgrade, leads 447a-447n may be coupled to corresponding multiplexer ports, allowing for easy integration of a multiplexer (to perform WDM) into the network, as described in more detail below in conjunction with FIG. 5. There may be any suitable number of leads in network 400.

Primary power splitter 448 comprises any suitable power splitter, such as an optical coupler, and is operable to split a downstream optical signal into a suitable number of copies and to combine a plurality of upstream optical signals into one signal. In the illustrated example, primary power splitter 448 is operable to broadcast the traffic in $\lambda_d$ and $\lambda_v$ by splitting the downstream signal comprising these wavelengths into four copies (which are then forwarded to secondary power splitters 449 for eventual receipt by all ONUs 450). Primary power splitter 448 is also operable to combine upstream traffic transmitted over $\lambda_u$ by ONUs 450 into one signal. Although primary power splitter 448 is illustrated as a 1×4 power splitter, primary power splitter 448 may comprise any suitable splitter or combination of splitters such that each ONU 450 receives a copy of the traffic in $\lambda_d$ and $\lambda_v$ and such that the upstream signals from ONUs 450 are combined for communication to OLT 420. A wavelength router and a power splitter may each be members of a group referred to as distributors.

Each secondary power splitter 449 comprises any suitable power splitter, such as an optical coupler or combination of couplers, operable to split a downstream signal and combine an upstream signal. In the downstream direction, each secondary power splitter 449 is operable to receive a signal from primary power splitter 448 and distribute the combined signal to a corresponding group of ONUs 450 (in addition, after upgrade to WS-HPON, secondary power splitters 449 serve to combine signals received from primary power splitter 448 and from the multiplexer inserted into lead termination section 446, as described below, and to distribute this combined signal to ONUs 450). Pre-upgrade, secondary power splitters 449 only receive a signal from primary power splitter 448 and do not receive a signal from lead termination section 446. After a multiplexer is added to the network, however, secondary power splitters 449 may receive a signal from primary power splitter 448 and the multiplexer (coupled to lead termination section 446). In the upstream direction, each secondary power splitter 449 is operable to receive and combine traffic over time-shared $\lambda_u$ from a corresponding group of ONUs 450, split the combined traffic into two copies, and distribute one copy to lead termination section 446 and one copy to primary power splitter 448. In the illustrated example, the copy passed to lead termination section 446 is terminated, and the copy passed to primary power splitter 448 is combined with other upstream signals (from the other secondary power splitters 449) and forwarded to filter 442. It should be noted that although secondary power splitters 449 are represented by 2×4 couplers in the illustrated example, any suitable coupler (or combination of couplers) may be used.

Each ONU 450 (which may be an example of a downstream terminal) may comprise any suitable ONU or ONT. In the illustrated example network, ONU 450 comprises a filter 460, a receiver 462, a filter 470, a receiver 472, and a transmitter 482. Since each ONU 450 in the illustrated example comprises two receivers and one transmitter, it may be referred to as a triplexer. However, any suitable number of transmitters and/or receivers may reside at each ONU. Each filter 460 may comprise any suitable filter operable to direct traffic in $\lambda_v$ to a corresponding receiver 462 and to pass traffic in $\lambda_d$ in the downstream direction and $\lambda_u$ in the upstream direction. Each receiver 462 may include any suitable receiver operable to receive traffic in $\lambda_v$ from a corresponding filter 460 and process the traffic. Each filter 470 may comprise any suitable filter operable to direct the traffic in $\lambda_d$ to a corresponding receiver 472 and to pass the traffic in $\lambda_u$ in the upstream direction. Each receiver 472 may include any suitable receiver operable to receive the traffic in $\lambda_d$ from a corresponding filter 470 and process the traffic. Each transmitter 482 may comprise any suitable transmitter operable to transmit the traffic in $\lambda_u$ upstream. ONUs 450 may time-share $\lambda_u$ using a suitable communication protocol to avoid collision of upstream traffic. It should be noted that any suitable number of ONUs 450 may be implemented in PSPON 400.

In operation, in the downstream direction, transmitter 422 of OLT 420 may transmit downstream traffic (for example, analog video) over $\lambda_v$, and transmitter 425 may transmit downstream traffic (for example, digital data) over $\lambda_d$. Filter 428 receives the two signals and passes the traffic in $\lambda_v$ and directs the traffic in $\lambda_d$ (thereby combining the traffic into one signal) to filter 429. Filter 429 receives the combined signal comprising the traffic in $\lambda_v$ and $\lambda_d$ and allows the signal to pass over fiber 430 to filter 442 of RN 440. Filter 442 receives the signal comprising the traffic in $\lambda_d$ and $\lambda_v$ and directs the traffic in both wavelengths to primary power splitter 448. Primary power splitter 448 receives the signal comprising the traffic in $\lambda_d$ and $\lambda_v$, splits the traffic into multiple copies (in this example, four copies), and forwards each copy to a corresponding secondary power splitter 449. Each secondary power splitter 449 receives a copy of the signal comprising the traffic in $\lambda_d$ and $\lambda_v$, splits the copy into multiple additional copies (in this example, four additional copies of each copy), and passes each additional copy over fiber 430 to a corresponding ONU 450. Each ONU 450 receives a copy of the signal comprising the traffic in $\lambda_d$ and $\lambda_v$ at a corresponding filter 460. Each filter 460 passes the traffic in $\lambda_d$ to filter 470 and directs the traffic in $\lambda_v$ to receiver 462. Filter 470 receives the traffic in $\lambda_d$ and directs it to receiver 472. Receivers 462 and 472 receive and process the traffic in $\lambda_v$ and $\lambda_d$, respectively.

In the upstream direction, transmitter 482 of each ONU 450 transmits traffic over time-shared $\lambda_u$. The traffic in $\lambda_u$ passes through filters 470 and 460 and over fiber 430 to RN 440. RN 440 receives the traffic in $\lambda_u$ from each ONU 450 at a corresponding secondary power splitter 449. Each secondary power splitter 449 splits the signal into two copies, and forwards one copy to lead termination section 446 and the other copy to primary power splitter 448. Lead termination section 446 receives a copy of the traffic in $\lambda_u$ from each secondary power splitter 449 and terminates the traffic. Primary power splitter 448 receives a copy of the upstream signal from each secondary power splitter 449, combines the signals into one signal, and forwards the combined signal to filter 442. Filter 442 receives the signal comprising the traffic in $\lambda_u$ and directs the signal to OLT 420. The signal travels over fiber 430 to filter 429 of OLT 420. Filter 429 directs the traffic in $\lambda_u$ to receiver 426. Receiver 426 receives the traffic in $\lambda_u$ and processes it.

Therefore, PSPON 400 operates similarly to PSPON 10 (in that both broadcast downstream signals and time-share an upstream signal). However, unlike PSPON 10, PSPON 400 allows for an easy upgrade to a WS-HPON. The optical fiber connecting OLT 420 and ONTs 450 need not be cut to perform this upgrade (thereby avoiding network downtime and the risk of contamination of connectors), and the upgrade to a multiplexer at RN 440 and to multiple transmitters and a multiplexer at OLT 420 may be performed almost completely in-service.

Modifications, additions, or omissions may be made to the PSPON 400 described without departing from the scope of the invention. The components of the PSPON 400 described may be integrated or separated according to particular needs. Moreover, the operations of the PSPON 400 described may be performed by more, fewer, or other components. As examples only, alternative networks may comprise redundant lines from the OLT suitably coupled to the RN, the RN may provide any suitable number of outputs to the ONUs, and any suitable number of wavelength routers may be added to the RN (making suitable changes to the network).

Figure 5:
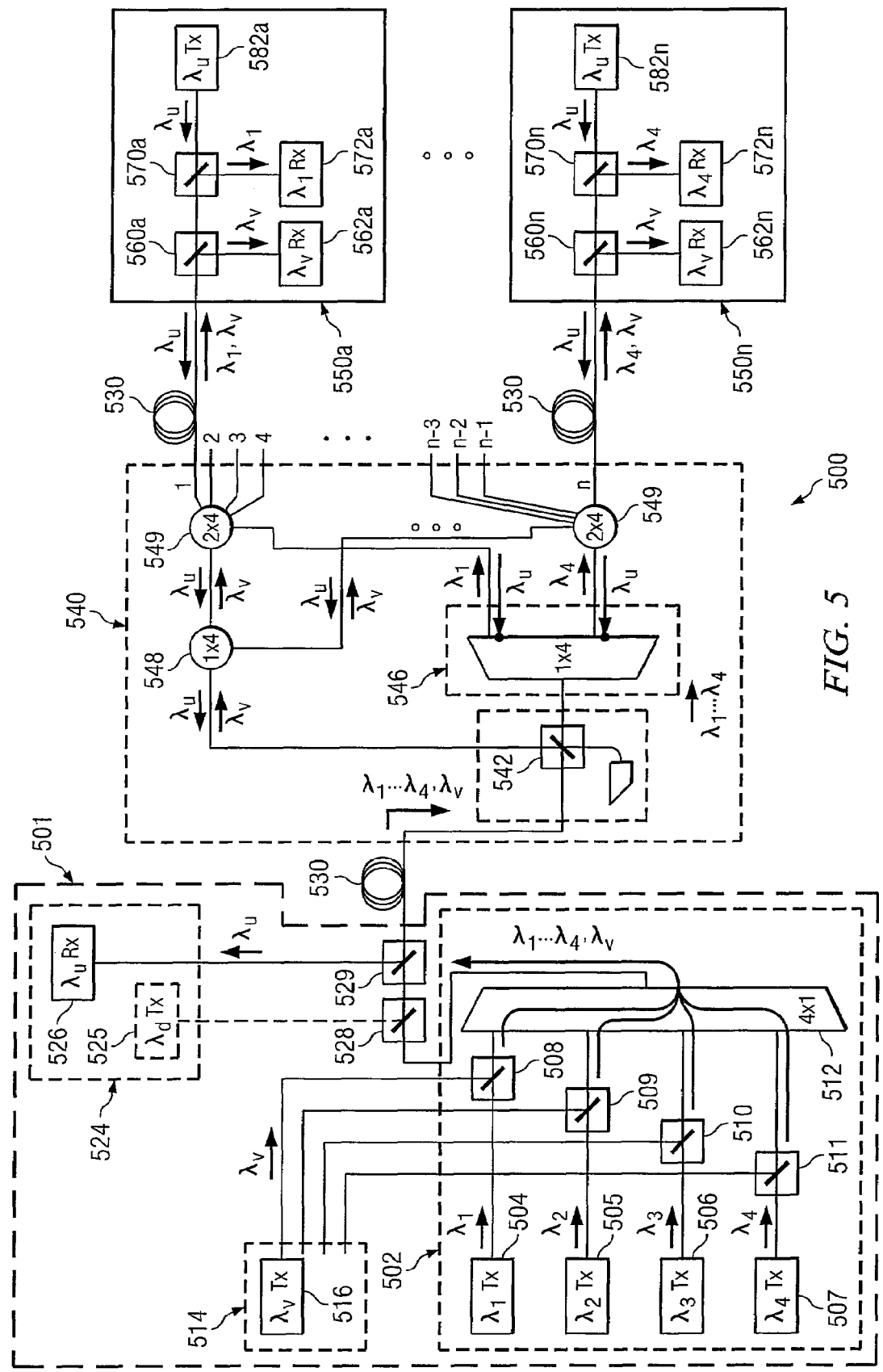
FIG. 5 is a diagram illustrating in more detail the example WS-HPON of FIG. 3.

FIG. 5 is a diagram illustrating in more detail the example WS-HPON of FIG. 3. The example WS-HPON 500 of FIG. 5 also illustrates an upgrade from upgradeable PSPON 400 of FIG. 4. As described above, WS-HPONs may be more attractive upgrade options than many other HPONs or WDMPONs. By sharing downstream WDM wavelengths, WS-HPONs provide an increase in bandwidth over PSPONs at a much lower price than many other HPONs or WDMPONs.

WS-HPON 500 comprises OLT 501, fiber 530, RN 540, and ONUs 550. OLT 501 (which may be an example of an upstream terminal) comprises WDM transmission section 502, upgradeable transmission section 514, PSPON transceiver 524, and filters 528 and 529. WDM transmission section 502 comprises transmitters 504-507, filters 508-511, and multiplexer 512. Each transmitter 504-507 may comprise any suitable transmitter and is operable to transmit traffic over a corresponding wavelength, $\lambda_1$-$\lambda_4$, respectively. It should be noted that although example WS-HPON 500 does not provide WDM for upstream traffic, and thus new receivers are not needed in conjunction with new transmitters 504-507, it may be economical to implement transceivers (transmitter and receiver) in WDM transmission section 502 instead of only transmitters (in anticipation of a further upgrade to WDM upstream). The cost of transceivers is typically less than the cost of a separate transmitter and receiver, thus reducing the eventual overall cost to upgrade to a WDMPON. It should further be noted that although only four new transmitters are illustrated in example WS-HPON 500, any suitable number of transmitters (or transceivers) may be included.

Each filter 508-511 may comprise any suitable filter and is operable to pass the traffic in $\lambda_1$-$\lambda_4$, respectively. In addition, filter 508 is operable to direct the traffic in wavelength $\lambda_v$ from transmitter 516 of upgradeable transmission section 514 to multiplexer 512 (such that the traffic in both $\lambda_1$ and $\lambda_v$ is forwarded to multiplexer 512 over the same fiber). In fact, each filter 508-511 may be coupled to upgradeable transmission section 514 (through a corresponding fiber), allowing for an easy upgrade if more transmitters are added to WS-HPON 500. The fibers coupling filters 509-511 and upgradeable transmission section 514 do not carry a signal in the illustrated example WS-HPON 500 of FIG. 5, as no new transmitters have been added to upgradeable transmission section 514. However, filters 509-511 may be operable to direct the traffic in the corresponding wavelengths associated with potential transmitters added to upgradeable transmission section 514. After the upgrade, filters 509-511 would direct the traffic in the corresponding wavelength from upgradeable transmission section 514 in a similar manner as filter 508 directs the traffic in $\lambda_v$.

Upgradeable transmission section 514 comprises transmitter 516 and a set of three terminating fiber leads. Transmitter 516 comprises any suitable transmitter and is operable to transmit traffic over $\lambda_v$. Transmitter 516 may be the same as transmitter 422 of network 400, and thus $\lambda_v$ of WS-HPON 500 may be the same as $\lambda_v$ of network 400. Transmitter 516 may transmit analog video traffic over $\lambda_v$. The three terminating fiber leads may be coupled to new transmitters if new transmitters are added to upgrade example WS-HPON 500. As discussed above, each terminating lead is coupled to a corresponding filter, one of filters 509-511. It should be noted that although only three fiber leads are illustrated, any suitable number of leads may be added in anticipation of further upgrades of WS-HPON 500.

Multiplexer 512 comprises any suitable multiplexer/demultiplexer (and may be considered a wavelength router) and is operable to combine the traffic in $\lambda_1$-$\lambda_4$ and $\lambda_v$ into one signal. In the illustrated example 500, multiplexer 512 comprises a cyclic multiplexer operable to receive and combine the traffic in more than one wavelength through each port (such as the traffic in $\lambda_1$ and $\lambda_v$ through the first port). In other example networks, multiplexer 512 may be a typical N×1 multiplexer operable to receive only the traffic in one wavelength through each port. Where the traffic in a large number of wavelengths is being multiplexed, a cyclic multiplexer may prove more cost-efficient than a multiplexer having N ports.

Furthermore, a cyclic multiplexer may not need to be replaced to add more ports (as with typical multiplexers) if more transmitters are added to the OLT to upgrade WS-HPON 500. For example, WS-HPON 500 may be upgraded to transmit traffic in eight downstream wavelengths, including $\lambda_1$-$\lambda_4$ and additional wavelengths $\lambda_5$-$\lambda_8$. In such an upgrade, cyclic multiplexer 512 need not be replaced to receive the traffic in the four additional wavelengths, as the multiplexer's first port may receive the traffic in $\lambda_1$ and $\lambda_5$, the second port may receive the traffic in $\lambda_2$ and $\lambda_6$, the third port may receive the traffic in $\lambda_3$ and $\lambda_7$, and the fourth port may receive the traffic in $\lambda_4$ and $\lambda_8$. In the contrasting situation in which non-cyclic multiplexers are used, a 4×1 multiplexer would need to be replaced by an 8×1 multiplexer to receive the traffic in the four additional wavelengths.

PSPON transceiver 524 comprises transmitter 525 and receiver 526. Transmitter 525 may be the same transmitter as transmitter 425 of FIG. 4. However, in WS-HPON 500 of FIG. 5, transmitter 525 may no longer transmit traffic over the network, and may be replaced by transmitters 504-507 of WDM transmission section 502. Transmitter 525 may, in particular embodiments, remain in place to provide limited protection for failure of the downstream WDM transmitters or to keep the network operational at lower bandwidth during particular upgrades of the network (such as, for example, an upgrade of the multiplexer in the RN). In alternative embodiments, transmitter 525 may continue to transmit downstream traffic at $\lambda_d$ after an upgrade to an HPON, and $\lambda_d$ may be reused as a routed, WDM wavelength, as discussed further below in conjunction with FIGS. 7-10D. Receiver 526 of transceiver 524 may comprise any suitable receiver (and may be the same as receiver 426 of network 400) and is operable to receive upstream traffic carried over time-shared $\lambda_u$.

Filter 528 comprises any suitable filter operable to pass the traffic in $\lambda_1$-$\lambda_4$ and $\lambda_v$ to filter 529. Filter 528 may also be operable to pass the traffic in additional wavelengths to be transmitted in upgrades of WS-HPON 500. Although illustrated in-line in WS-HPON 500, in other example embodiments, filter 528 may be switched out of the line using a suitable switch.

Filter 529 comprises any suitable filter operable to pass the traffic in $\lambda_1$-$\lambda_4$ and $\lambda_v$ over fiber 530 to RN 540. Filter 528 may also be operable to pass traffic in additional wavelengths to be transmitted in upgrades of WS-HPON 500. In addition, filter 529 is operable to direct traffic in upstream wavelength $\lambda_u$ to receiver 526.

Optical fiber 530 may comprise any suitable fiber to carry upstream and downstream traffic. In certain WS-HPONs 500, optical fiber 530 may comprise, for example, bidirectional optical fiber. In other WS-HPONs 500, optical fiber 530 may comprise two distinct fibers, one carrying downstream traffic and the other carrying upstream traffic.

RN 540 comprises filter 542, multiplexer 546, primary power splitter 548, and secondary power splitters 549. RN 540 is operable to receive the traffic in $\lambda_1$-$\lambda_4$ and $\lambda_v$ from OLT 501, filter out and broadcast the traffic in $\lambda_v$, and demultiplex and forward the traffic in $\lambda_1$-$\lambda_4$ to the ONUs in corresponding groups of wavelength-sharing ONUs 550. RN 540 is further operable to receive from ONUs 550 upstream signals carried over time-shared wavelength $\lambda_u$, combine these signals, and forward the combined traffic in $\lambda_u$ to OLT 501. To reiterate, WS-HPON 500 is operable to allow wavelength-sharing among groups of ONUs 550, thereby increasing network capacity while avoiding the costly components of a full downstream WDM network such as that in other HPONs or WDM-PON.

Filter 542 may comprise any suitable filter operable to receive a signal comprising traffic in $\lambda_1$-$\lambda_4$ and $\lambda_v$, pass the traffic in $\lambda_1$-$\lambda_4$ to multiplexer 546, and direct the traffic in $\lambda_v$ to primary power splitter 548. Although filter 542 in the illustrated example includes only one filter, filter 542 may comprise any suitable number of filters (coupled to optional switches) to facilitate an upgrade of the network. In the upstream direction, filter 542 is operable to receive the traffic in $\lambda_u$ and direct it toward OLT 501.

Multiplexer 546 may include any suitable multiplexer/demultiplexer (and may be considered a wavelength router) and is operable to receive the signal comprising the traffic in $\lambda_1$-$\lambda_4$ and demultiplex the signal. Although in the illustrated example, multiplexer 546 is a 1×4 multiplexer, in alternative networks, multiplexer 546 may have any suitable number of ports. Also, in alternative networks, multiplexer 546 may comprise two or more separate multiplexers receiving downstream signals from one or more upstream sources and forwarding the traffic downstream such that ONUs share wavelengths. In the illustrated example network, multiplexer 546 may comprise a cyclic multiplexer (in which each port is operable to carry traffic in more than one wavelength). In the downstream direction, each output port of multiplexer 546 is operable to forward the traffic in a corresponding one of $\lambda_1$-$\lambda_4$ to a corresponding secondary power splitter 549. In alternative embodiments, the traffic in each wavelength may pass to a different secondary power splitter than that illustrated, the traffic in more than one wavelength may pass to a secondary power splitter, and/or multiplexer 546 may receive, multiplex, and pass traffic in more than four downstream wavelengths. It should be noted that to upgrade PSPON 400 to WS-HPON 500, multiplexer 546 may be added to the lead termination section 446 of upgradeable PSPON network 400 (with input lead 447a coupled to the multiplexer's input port and output leads 447b-447n coupled to the multiplexer's output ports).

In the upstream direction, multiplexer 546 may be operable to receive and terminate the traffic in $\lambda_u$, as ONUs 550 of example WS-HPON 500 time-share $\lambda_u$ (and do not transmit traffic over multiple upstream wavelengths). Alternatively, multiplexer 546 may forward this traffic to filter 542 for suitable termination (where termination may be performed internally or externally). However, if WS-HPON 500 is upgraded to provide WDM upstream, multiplexer 546 may be operable to receive traffic in multiple upstream wavelengths from ONUs 550 and multiplex the traffic in these wavelengths, forwarding them to OLT 501.

Primary power splitter 548 may comprise any suitable power splitter and may be primary power splitter 448 of network 400. In the illustrated example WS-HPON, primary power splitter 548 is operable to receive the traffic in $\lambda_v$ and split the traffic into four copies. The power of each copy may be less than one-fourth of the power of the original signal $\lambda_v$. Primary power splitter 548 is operable to forward each copy to a corresponding secondary power splitter 549. In the upstream direction, primary power splitter 548 is operable to receive traffic transmitted by ONUs 550 over time-shared $\lambda_u$ from secondary power splitters 549 and combine this traffic into one signal. Primary power splitter 548 forwards the upstream signal to OLT 501. Primary power splitter 548 thus broadcasts the traffic in $\lambda_v$ in the downstream direction and combines traffic over time-shared $\lambda_u$ in the upstream direction. Although primary power splitter 548 is illustrated as a 1×4 power splitter, any suitable power splitter may be used.

Each secondary power splitter 549 may comprise any suitable power splitter, such as an optical coupler, operable to receive a signal from primary power splitter 548 and a signal from multiplexer 546, combine the two signals into one signal, split the combined signal into a suitable number of copies, and forward each copy to the ONUs in a corresponding wavelength-sharing group of ONUs 550 (each group of wavelength-sharing ONUs shares one of $\lambda_1$-$\lambda_4$ in the downstream direction). In the upstream direction, each secondary power splitter 549 is operable to receive traffic transmitted at $\lambda_u$ from each ONU 550 of a corresponding group of ONUs 550 and combine the traffic from each ONU 550 into one signal. Each secondary power splitter 549 is operable to split the combined upstream traffic into two copies and forward one copy to primary power splitter 548 and one copy to multiplexer 546. The copy forwarded to primary power splitter 548, as described above, is combined with other traffic from other ONUs 550 transmitted over time-shared $\lambda_u$. The copy forwarded to multiplexer 546 may be blocked or forwarded to filter 542 for suitable termination. Although secondary power splitters 549 are illustrated as 2×4 couplers in example WS-HPON 500, secondary power splitters 549 may be any suitable coupler or combination of couplers (such as a 2×2 coupler coupled to two 1×2 couplers). Secondary power splitters 549 may split or combine any suitable number of signals.

Each ONU 550 (which may be an example of a downstream terminal) may comprise any suitable ONU or ONT and may be the same as ONU 450 of FIG. 4. ONU 550 of FIG. 5 comprises a filter 560, receiver 562, filter 570, receiver 572, and transmitter 582. Each filter 560 may comprise any suitable filter and may be the same as filter 460 of network 400. Each filter 560 is operable to direct traffic in wavelength $\lambda_v$ (for example, analog video traffic) to receiver 562. Filter 560 is further operable to pass the traffic in the corresponding one of $\lambda_1$-$\lambda_4$ received at the ONU 550 to filter 570 and to pass the traffic in $\lambda_u$ to RN 540 in the upstream direction. Receiver 562 may comprise any suitable receiver and may be the same as receiver 462 of network 400. Receiver 562 is operable to receive the traffic transmitted in $\lambda_v$ and process the traffic. Each filter 570 may comprise any suitable filter and may be the same as filter 470 of network 400. Each filter 570 is operable to receive the traffic in a corresponding one of $\lambda_1$-$\lambda_4$ and direct it to receiver 572. Filter 570 is further operable to pass the traffic in upstream wavelength $\lambda_u$ to corresponding filter 560 in the upstream direction. Receiver 572 may comprise any suitable receiver and may be the same as receiver 472 of network 400. Receiver 572 is operable to receive the traffic transmitted in a corresponding one of $\lambda_1$-$\lambda_4$ and process the traffic. Receiver 572 may be operable to receive traffic in any one of $\lambda_1$-$\lambda_4$, providing flexibility in assigning (or re-assigning) an ONU 550 to a particular wavelength-sharing group. Each transmitter 582 may comprise any suitable transmitter and may be the same as transmitter 482 of network 400. Transmitter 582 is operable to transmit traffic over $\lambda_u$ in the upstream direction, applying a suitable protocol to time-share $\lambda_u$ with the other ONUs 550. It should be noted that although four ONUs are illustrated as being part of a group of ONUs in WS-HPON 500, any suitable number of ONUs may be part of a group sharing a downstream wavelength. In addition, there may be multiple groups each sharing a different downstream wavelength (as is the case in the illustrated example). It should also be noted that any suitable number of ONUs 550 may be implemented in the network. It should further be noted that ONUs 550 may be adjusted in an alternative upgrade to transmit traffic over multiple wavelengths (which may be combined by PS 548 of RN 540) to be received by receivers corresponding to transmitters 504-507 (in which case filter 529 may or may not be taken out of the line). In an alternative upgrade, each group of ONUs sharing a wavelength may transmit upstream traffic in a separate wavelength (and multiplexer 546 may multiplex these wavelengths at the RN, and receivers 504-507 may receive these wavelengths).

In operation, transmitters 504-507 and (analog video) transmitter 516 of OLT 501 may transmit traffic over $\lambda_1$-$\lambda_4$ and $\lambda_v$, respectively. Filters 508-511 receive the traffic in $\lambda_1$-$\lambda_4$, respectively, and pass the signals. Filter 508 also receives and directs the traffic in $\lambda_v$, combining it with the traffic in $\lambda_1$. As discussed above, WS-HPON 500 is configured to be easily upgraded to include additional transmitters at upgradeable transmission section 514 of OLT 501. After receiving the traffic in their corresponding wavelengths, filters 508-511 forward the corresponding signals to multiplexer 512. Multiplexer 512, which may include, for example, a cyclic multiplexer, combines the traffic in the five wavelengths into one signal and forwards the signal to filter 528. As discussed above, filter 528 may be in-line or may be switched out of the line, in which case the downstream signal would pass directly to filter 529. If filter 528 remains in-line, filter 528 receives the downstream signal and allows the signal to pass to filter 529. Filter 529 receives the signal and allows the signal to pass, forwarding the signal over optical fiber 530 to RN 540.

Filter 542 of RN 540 receives the signal and directs the traffic in (e.g., analog video) wavelength $\lambda_v$ to primary power splitter 548, allowing the traffic in $\lambda_1$-$\lambda_4$ to pass to multiplexer 546. Primary power splitter 548 receives the traffic in $\lambda_v$ and splits it into a suitable number of copies. In the illustrated embodiment, primary power splitter 548 splits the traffic in $\lambda_v$ into four copies, and forwards each copy to a corresponding secondary power splitter 549. Multiplexer 546 receives the signal comprising the traffic in $\lambda_1$-$\lambda_4$ and demultiplexes the signal into its constituent wavelengths. Multiplexer 546 then forwards the traffic in each wavelength along a corresponding fiber such that each secondary power splitter 549 receives the traffic in a corresponding one of $\lambda_1$-$\lambda_4$. Each secondary power splitter 549 thus receives traffic in a corresponding one of $\lambda_1$-$\lambda_4$ from multiplexer 546 and a copy of traffic in $\lambda_v$ from primary power splitter 548, combines the two wavelengths into one signal, and splits the signal into a suitable number of copies. In the illustrated embodiment, each secondary power splitter 549 splits the signal into four copies. In this way, the traffic (e.g., analog video) in wavelength $\lambda_v$ is broadcast to all ONUs 550 and a corresponding one of $\lambda_1$-$\lambda_4$ is transmitted to and shared by one or more groups of ONUs 550. It should be noted again that the groups of ONUs sharing a wavelength may be different than those illustrated in FIG. 5, and groups of wavelength-sharing ONUs may share more than one WDM wavelength in alternative networks.

After secondary power splitters 549 split the signal comprising the traffic in a corresponding one of $\lambda_1$-$\lambda_4$ and the traffic in $\lambda_v$ into four copies, secondary power splitters 549 forward each copy over fiber 530 such that the ONUs 550 coupled to the secondary power splitter 549 receive a copy. Filter 560 of each ONU 550 receives the signal and directs the traffic in $\lambda_v$ to receiver 562, which then processes the traffic carried over $\lambda_v$. Filter 560 passes the corresponding one of $\lambda_1$-$\lambda_4$ to filter 570. Filter 570 receives the traffic in the corresponding one of $\lambda_1$-$\lambda_4$ and directs the traffic to receiver 572 which then processes the traffic. Again, since each ONU 550 in a group may share one of $\lambda_1$-$\lambda_4$ with other ONUs 550 in the group, ONUs 550 may apply a suitable addressing protocol to process downstream traffic appropriately (i.e., to determine which portion of the traffic transmitted in the corresponding wavelength is destined for which ONU 550 in a group).

In the upstream direction, transmitter 582 of each ONU 550 transmits traffic over $\lambda_u$. Filters 570 and 560 receive the traffic in $\lambda_u$ and pass the traffic. The signal travels over fiber 530 to RN 540. Each secondary power splitter 549 of RN 540 receives traffic over time-shared $\lambda_u$ and combines the traffic from each ONU 550 in the corresponding group of ONUs 550. Again, since each ONU 550 transmits traffic over upstream wavelength $\lambda_u$, ONUs 550 may adhere to a suitable protocol to time-share $\lambda_u$ such that traffic from multiple ONUs does not collide. After receiving and combining traffic over $\lambda_u$ into one signal, each secondary power splitter 549 splits the signal into two copies, forwarding one copy to multiplexer 546 and one copy to primary power splitter 548. As discussed above, multiplexer 546 of example network 500 may block $\lambda_u$ or forward $\lambda_u$ to filter 542 for suitable termination (internal or external to filter 542). Primary power splitter 548 receives traffic over $\lambda_u$ from each secondary power splitter 549, combines the traffic, and forwards the traffic to filter 542. Filter 542 receives the combined traffic in $\lambda_u$ and directs the traffic toward OLT 501. Fiber 530 carries the traffic in $\lambda_u$ to filter 529 of OLT 501. Filter 529 receives the traffic in $\lambda_u$ and directs the traffic toward receiver 526. Receiver 526 receives the traffic and processes it.

Modifications, additions, or omissions may be made to the example WS-HPON 500 described without departing from the scope of the invention. The components of the example WS-HPON 500 described may be integrated or separated according to particular needs. Moreover, the operations of the example WS-HPON 500 described may be performed by more, fewer, or other components. As examples only, alternative networks may comprise redundant lines from the OLT suitably coupled to the RN, the RN may provide any suitable number of outputs to the ONUs, and any suitable number of wavelength routers may be added to the RN (making suitable changes to the network).

As discussed above, WS-HPON 500 is an attractive PSPON upgrade for many network operators because it increases network capacity by introducing wavelength division multiplexing of downstream traffic without modifying ONUs 550, avoiding the cost of replacing components at each ONU and of creating substantial disruption in service. WS-HPON 500 thus allows for a desired increase in downstream bandwidth through WDM at a reasonable and efficient cost. In addition, WS-HPON 500 is configured to allow additional upgrades as demand for bandwidth increases (for example, adding additional downstream wavelengths and eventually upgrading to full WDMPON) without a substantial disruption to the network.

Figure 6:
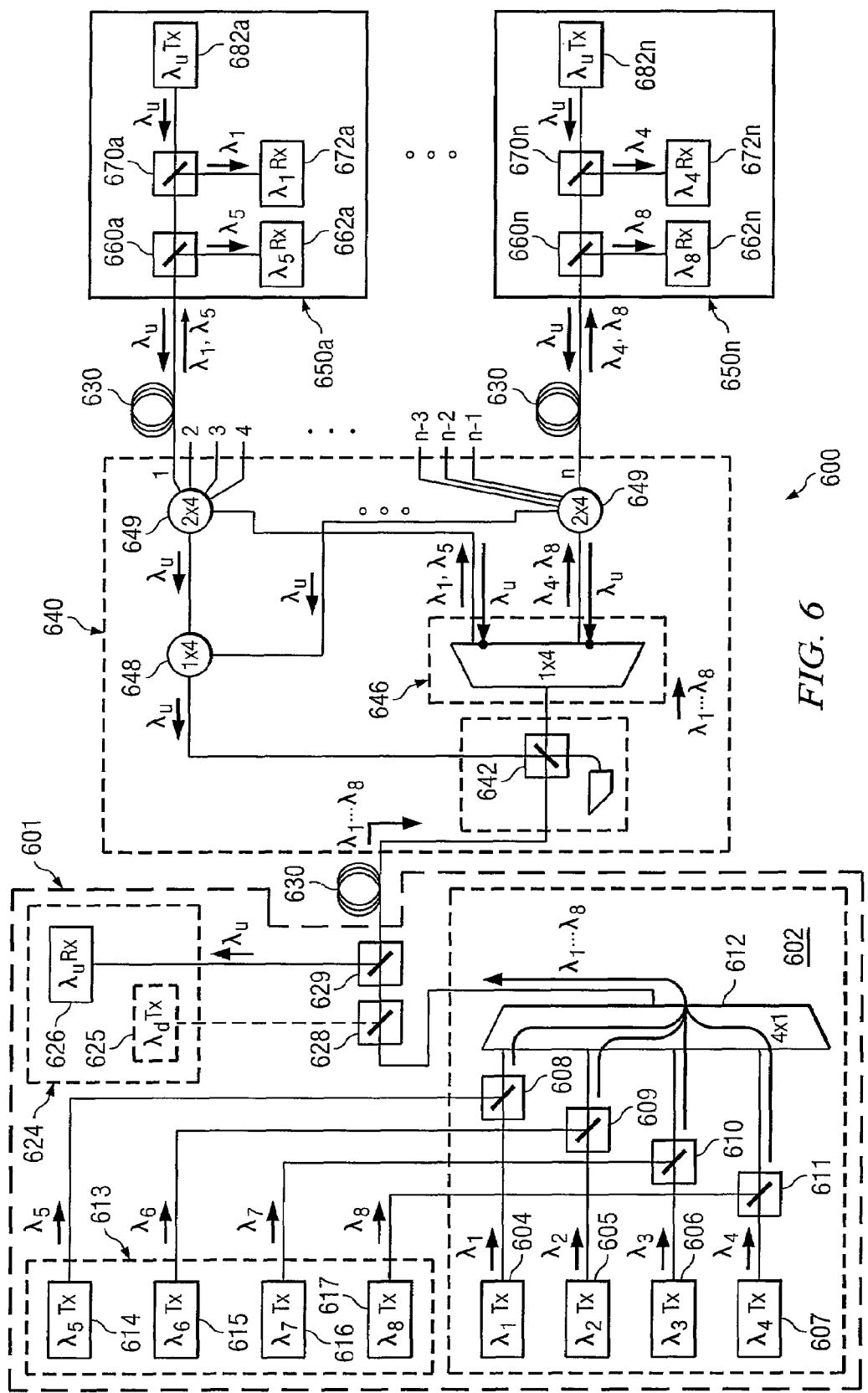
FIG. 6 is a diagram illustrating an example upgrade to the example WS-HPON of FIG. 5.

FIG. 6 is a diagram illustrating an example upgrade to the example WS-HPON of FIG. 5. Upgraded WS-HPON 600 comprises additional transmitters that allow traffic to travel over additional wavelengths, thereby increasing the capacity of the network. As discussed above in conjunction with FIG. 5, example WS-HPON 500 is configured to be easily upgradeable to include additional transmitters. These additional transmitters may replace transmitter 516 and may transmit in and around the same band used by transmitter 516.

Example upgraded WS-HPON 600 comprises OLT 601, optical fiber 630, RN 640, and ONUs 650. OLT 601 (which may be an example of an upstream terminal) comprises first transmission section 602, second transmission section 613, transceiver 624, and filters 628 and 629. First transmission section 602 comprises transmitters 604-607, filters 608-611, and multiplexer 612. Transmitters 604-607 may be the same transmitters as transmitters 504-507 of FIG. 5; thus, these transmitters will not be described again. Filters 608-611 may be the same as filters 508-511 of FIG. 5; thus, these filters will also not be described again. However, it should be noted that each of filters 608-611 now receives traffic in a corresponding wavelength from a transmitter of second transmission section 613. Thus, in the illustrated embodiment, filters 608-611 receive $\lambda_1$-$\lambda_4$, respectively, and $\lambda_5$-$\lambda_8$, respectively. Multiplexer 612 may be the same as multiplexer 512 of FIG. 5; thus, multiplexer 612 will not be described. In particular example networks in which multiplexer 612 is a cyclic multiplexer (as illustrated), multiplexer 612 receives more than one wavelength at each port. In example networks in which multiplexer 612 is not a cyclic multiplexer, filters 608-611 may not be needed (as each transmitter would transmit traffic directly to an input port of multiplexer 612). It should be noted that although eight transmitters, four filters, and one multiplexer are illustrated in example WS-HPON 600, any suitable components may be used to forward WDM signals comprising any suitable number of wavelengths to RN 640.

Second transmission section 613 comprises additional transmitters to transmit traffic over additional wavelengths. In the illustrated example WS-HPON, additional transmitters 614-617 transmit traffic over $\lambda_5$-$\lambda_8$, respectively. In particular example networks, the traffic may be digital data traffic, replacing the analog video signal transmitted by transmitter 516 of example WS-HPON 500. It should be noted that in addition to replacing the video analog transmitter in particular example networks, transmitters 614-617 may also transmit in and around the same band that the analog video signal was transmitted such that receivers 562 of network 500 may be used as receivers 662 of network 600. It should further be noted that although example WS-HPON 600 does not provide WDM for upstream traffic, and thus new receivers are not needed in conjunction with new transmitters 614-617, it may be most economical to implement transceivers for second transmission section 613 instead of only transmitters (in anticipation of a further upgrade to WDM upstream).

Transceiver 624 may be the same as transceiver 524 of FIG. 5; thus, transceiver 624 will not be described again. Filters 628 and 629 may be the same as filters 528 and 529 of FIG. 5; however, it should be noted that filters 628 and 629 are operable to pass $\lambda_1$-$\lambda_8$ in the downstream direction, and filter 629 is operable to direct $\lambda_u$ toward receiver 626. In addition, as discussed in conjunction with filter 528 of FIG. 5, filter 628 may be switched out of the line. As discussed in conjunction with filter 529 of network 500, filter 629 may be removed in alternative networks to allow for WDM upstream.

Optical fiber 630 may comprise any suitable fiber and is operable to carry upstream and downstream traffic. In particular networks, optical fiber 630 may comprise, for example, bidirectional optical fiber. In alternative networks, optical fiber 630 may comprise two different fibers, one for upstream traffic and one for downstream traffic.

RN 640 comprises filter 642, multiplexer 646, primary power splitter 648, and secondary power splitters 649. Filter 642 may comprise any suitable filter operable to pass $\lambda_1$-$\lambda_8$ to multiplexer 646. Filter 642, in particular embodiments, no longer directs any of the downstream wavelengths toward primary power splitter 648. In example WS-HPON 600, filter 642 continues to direct upstream wavelength $\lambda_u$ toward OLT 601. Thus, filter 642 may be the same as filter 542 of FIG. 5 in some embodiments; however, in alternative embodiments, filter 642 may replace filter 542 if filter 542 is not operable to pass $\lambda_1$-$\lambda_8$.

Multiplexer 646 may be the same as multiplexer 546 of FIG. 5 and thus will not be described again. However, it should be noted that multiplexer 646 now demultiplexes $\lambda_5$-$\lambda_8$ in addition to $\lambda_1$-$\lambda_4$. In the illustrated embodiment, multiplexer 646 is a 1×4 cyclic multiplexer, and forwards $\lambda_1$ and $\lambda_5$ through the first output port, $\lambda_2$ and $\lambda_6$ through the second output port, $\lambda_3$ and $\lambda_7$ through the third output port, and $\lambda_4$ and $\lambda_8$ through the fourth output port. In alternative embodiments, multiplexer 646 may be any other suitable multiplexer, and may, for example, forward only one wavelength per output port. In addition, multiplexer 646 may have any suitable number of ports and not necessarily the number illustrated in FIG. 6. It should be noted that in some instances, a cyclic multiplexer may be most cost-efficient, as it may not need to be replaced if the number of downstream wavelengths is increased and exceeds the number of multiplexer ports (such as the increase due to the upgrade illustrated in FIG. 6).

Primary power splitter 648 may be the same as primary power splitter 548 of FIG. 5 and thus will not be described again. However, it should be noted that, in the illustrated example, primary power splitter 648 no longer receives downstream wavelengths since downstream wavelengths $\lambda_1$-$\lambda_8$ are now all routed by multiplexer 646. However, primary power splitter 648 continues to receive and combine upstream traffic over $\lambda_u$ and forward the combined signal to OLT 601. In alternative embodiments, if a transmitter at OLT 601 transmits traffic for broadcast to all ONUs, primary power splitter 648 is operable to receive and split that signal into copies for distribution to all ONUs 650.

Secondary power splitters 649 may be the same as secondary power splitters 549 of FIG. 5 and thus will not be described again. However, it should be noted that in the downstream direction, in the illustrated example network, each secondary power splitter 649 receives traffic in a corresponding one or more of $\lambda_1$-$\lambda_8$ from multiplexer 646 and no signal from primary power splitter 648. In alternative embodiments, there may be a different number of secondary power splitters, and each secondary power splitter may receive different, less, or additional wavelengths. Each secondary power splitter 649 is operable to forward a corresponding one or more of $\lambda_1$-$\lambda_8$ to a corresponding group of ONUs 650. In this way, secondary power splitters 649 allow for wavelength-sharing among ONUs.

ONUs 650 (which may be examples of downstream terminals) may be the same as ONUs 550 of FIG. 5, and thus will not be described again. However, it should be noted that in the illustrated embodiment, in addition to receiving traffic in a corresponding one of $\lambda_1$-$\lambda_4$, each ONU 650 may receive traffic in a corresponding one of $\lambda_5$-$\lambda_8$. Filter 660 is thus operable to direct a corresponding one of $\lambda_5$-$\lambda_8$ to receiver 662. Receiver 662 is operable to receive traffic in $\lambda_5$-$\lambda_8$ (and there is no need to replace receiver 562 during the upgrade to network 600) since $\lambda_5$-$\lambda_8$ are in and around the same band as $\lambda_v$. Thus, receiver 662 is operable to process the signal carried in $\lambda_5$-$\lambda_8$. It should further be noted that the electronics downstream of receiver 662 may be converted to process digital data (as opposed to analog traffic) in some example networks. However, even if these electronics are not converted, they may nonetheless be operable to process digital data carried in $\lambda_5$-$\lambda_8$ suitably.

In operation, transmitters 604-607 and 614-617 of OLT 601 transmit downstream traffic over $\lambda_1$-$\lambda_8$, respectively. Filters 608-611 receive $\lambda_1$-$\lambda_4$, respectively, and $\lambda_5$-$\lambda_8$, respectively, combine their respective signals, and pass the signals to multiplexer 612. For example, filter 608 receives $\lambda_1$ and $\lambda_5$, combines the two signals into one signal, and passes the signal to multiplexer 612. Multiplexer 612, which may include, for example, a cyclic multiplexer, combines the eight wavelengths into one signal and forwards the signal to filter 628. As discussed above, filter 628 may be in-line or may be switched out of the line, in which case the signal would pass directly to filter 629. If filter 628 remains in-line, filter 628 receives the signal from multiplexer 612 and passes the signal to filter 629. Filter 629 receives the signal and allows the signal to pass, forwarding the signal over optical fiber 630 to RN 640.

Filter 642 of RN 640 receives the downstream signal and allows the traffic in $\lambda_1$-$\lambda_8$ to pass to multiplexer 646. In the illustrated example network, traffic in all downstream wavelengths is to be routed to multiplexer 646 and not split by primary power splitter 648 for general broadcast. Thus, primary power splitter 648 of the illustrated example receives none of the traffic in the downstream wavelengths. However, in alternative example networks, power splitter 648 may continue to receive traffic in one or more downstream wavelengths for general broadcast.

Multiplexer 646 receives the signal comprising traffic in $\lambda_1$-$\lambda_8$ and demultiplexes the signal. In the illustrated example network, multiplexer 646 is a cyclic multiplexer, and thus multiplexer 646 forwards traffic in a corresponding pair of wavelengths from each output port to a corresponding secondary power splitter 649. For example, multiplexer 646 forwards $\lambda_1$ and $\lambda_5$ through its first port, $\lambda_2$ and $\lambda_6$ through its second port, $\lambda_3$ and $\lambda_7$ through its third port, and $\lambda_4$ and $\lambda_8$ through its fourth port. Thus, multiple groups of ONUs share multiple wavelengths for reception of downstream traffic. Each secondary power splitter 649 receives a corresponding signal from multiplexer 646 (and no signal from primary power splitter 648) and splits the signal into a suitable number of copies. In the illustrated embodiment, each 2×4 secondary power splitter 649 splits the signal it receives from multiplexer 646 into four copies and forwards each copy to a corresponding ONU 650 over fiber 630. It should be noted again that in alternative networks, the ONUs sharing a WDM wavelength may be different than those illustrated in FIG. 6.

Each ONU 650 receives a copy forwarded by a corresponding secondary power splitter 649. Filter 660 of each ONU 650 receives the signal and directs the traffic in the corresponding one of $\lambda_5$-$\lambda_8$ to receiver 662, which then processes the signal. Filter 660 passes traffic in the corresponding one of $\lambda_1$-$\lambda_4$ to filter 670. Filter 670 directs the traffic in the corresponding one of $\lambda_1$-$\lambda_4$ to receiver 672, which then processes the signal. Again, since each ONU 650 in a group of wavelength-sharing ONUs may share a corresponding one of $\lambda_1$-$\lambda_4$ and a corresponding one of $\lambda_5$-$\lambda_8$ with other ONUs in the group, ONUs 650 may apply a suitable protocol to process the traffic appropriately.

The illustrated, example upgraded WS-HPON 600 has been shown and described as using the increased bandwidth provided by the upgrade to double the bandwidth of each existing group of wavelength-sharing ONUs 650. However, in alternative example networks, the increased bandwidth may be used to increase the number of groups of wavelength-sharing ONUs 650 (such as, for example, from four groups to eight groups) or to allocate bandwidth more dynamically among the ONUs in each group (such as, for example, having one ONU in a group receive and process traffic in two wavelengths and having another ONU in the group receive the traffic in the two wavelengths but process the traffic in only one of the wavelengths). In some of such cases, suitable changes to the RN 640 may be necessary.

In the upstream direction, transmitter 682 of each ONU 650 transmits traffic over $\lambda_u$. Filters 670 and 660 receive and pass the traffic in $\lambda_u$. The signal travels over fiber 630 to RN 640. Each secondary power splitter 649 of RN 640 receives traffic over time-shared $\lambda_u$ and combines the traffic from each ONU 650 in the corresponding group of ONUs 650. Again, since each ONU 650 transmits traffic over upstream wavelength $\lambda_u$, ONUs 650 may adhere to a suitable protocol to time-share $\lambda_u$ such that upstream traffic from ONUs 650 does not collide. After receiving and combining the upstream traffic from the ONUs 650 in the corresponding group into one signal, each secondary power splitter 649 splits the combined signal into two copies, forwarding one copy to multiplexer 646 and one copy to primary power splitter 648. As discussed above, multiplexer 646 of WS-HPON 600 terminates $\lambda_u$ or may allow $\lambda_u$ to pass to filter 642 for suitable termination (since upstream traffic is still not WDM in the illustrated example). Primary power splitter 648 receives traffic in $\lambda_u$ from each secondary power splitter 649, combines the traffic, and forwards the traffic to filter 642. Filter 642 receives the traffic in $\lambda_u$ and directs it toward OLT 601. Fiber 630 carries the traffic in $\lambda_u$ to filter 629 of OLT 601, which directs the traffic toward receiver 626. Receiver 626 receives the signal and processes it.

As demand for upstream bandwidth increases beyond current capacity, network operators may choose to upgrade their WS-HPON (such as WS-HPON 600) to provide WDM upstream as well as downstream. Network operators may upgrade to WDM upstream by providing every ONU within each group of wavelength-sharing ONUs with a transmitter(s) such that the ONUs of that group transmit traffic in the same upstream wavelength(s). Thus, for example, the ONUs in group one may transmit traffic over upstream wavelength $\lambda_1$ (and thus suitably time-share transmission over this wavelength), the ONUs in group two may transmit traffic over upstream wavelength $\lambda_2$ (and thus suitably time-share transmission over this wavelength), and so on. In alternative example networks, the ONUs of one group may transmit traffic over a first plurality of wavelengths, the ONUs of another group may transmit traffic over a second plurality of wavelengths, and so on. In fact, any suitable number of upstream wavelengths may be transmitted by the ONUs of each group (and members of one group may share an additional wavelength with members of another group). In an upgrade of network 600 (in which the OLT has eight receivers to receive eight upstream wavelengths), the ONUs of each group of ONUs may transmit traffic in two wavelengths (resulting in traffic being transmitted in eight total upstream wavelengths). As new transmitters may be added at the ONUs, the $\lambda_u$ transmitters of the ONUs may be replaced with these transmitters.

At the RN, the fibers on either side of the primary power splitter may be terminated, and filter 642 may be taken out of the line. The primary power splitter may no longer be used in either the downstream or upstream direction since the RN's multiplexer would suitably demultiplex downstream traffic and multiplex upstream traffic. For example, the multiplexer may receive a copy of traffic forwarded by each secondary power splitter at a corresponding port, combine the traffic received at its ports into one signal, and forward the combined signal to the OLT. Alternatively, in networks providing WDM upstream over sub-bands (such as, for example, sub-bands of $\lambda_u$), the upstream WDM signals may be received at power splitter 648 and forwarded to the OLT, and the upstream signals forwarded to multiplexer 646 may be suitably terminated.

At the OLT, the multiplexer/demultiplexer may demultiplex the upstream signal into its constituent wavelengths. If the demultiplexer is a cyclic multiplexer, each upstream port may output two or more wavelengths, and filters may further separate the traffic. Receivers coupled to downstream transmitters may receive the upstream traffic in a corresponding wavelength and process the traffic. In the alternative network in which WDM traffic is transmitted in sub-bands of $\lambda_u$, the filter coupling the $\lambda_u$ receiver may be taken out of the line, allowing the sub-bands to pass to the WDM upstream receivers in the OLT. Thus, downstream and upstream WDM would be provided. To upgrade the system further to WDMPON, additional transmitters and receivers would be added at the OLT and at the ONUs (corresponding to the number of additional transmitters and receivers needed to provide a dedicated downstream and upstream wavelength for each ONU) and suitable rewiring would take place at the RN.

Modifications, additions, or omissions may be made to the example WS-HPON 600 described without departing from the scope of the invention. The components of the WS-HPON 600 described may be integrated or separated according to particular needs. Moreover, the operations of the WS-HPON 600 described may be performed by more, fewer, or other components. As examples only, alternative networks may comprise redundant lines from the OLT suitably coupled to the RN, the RN may provide any suitable number of outputs to the ONUs, and any suitable number of wavelength routers may be added to the RN (making suitable changes to the network).

Some of the RN upgrades discussed above do not illustrate reusing the PSPON $\lambda_d$ wavelength as a downstream WDM wavelength or the PSPON $\lambda_d$ transmitter as a downstream WDM transmitter after an upgrade to HPON. However, some network operators may view the reuse of PSPON wavelengths and components as a cost-efficient measure. Thus, a need exists for an upgradeable PSPON RN that can be upgraded to an HPON RN or WDMPON RN that reuses the PSPON $\lambda_d$ wavelength as a downstream WDM wavelength and the PSPON $\lambda_d$ transmitter as a downstream WDM transmitter.

Figure 7A:
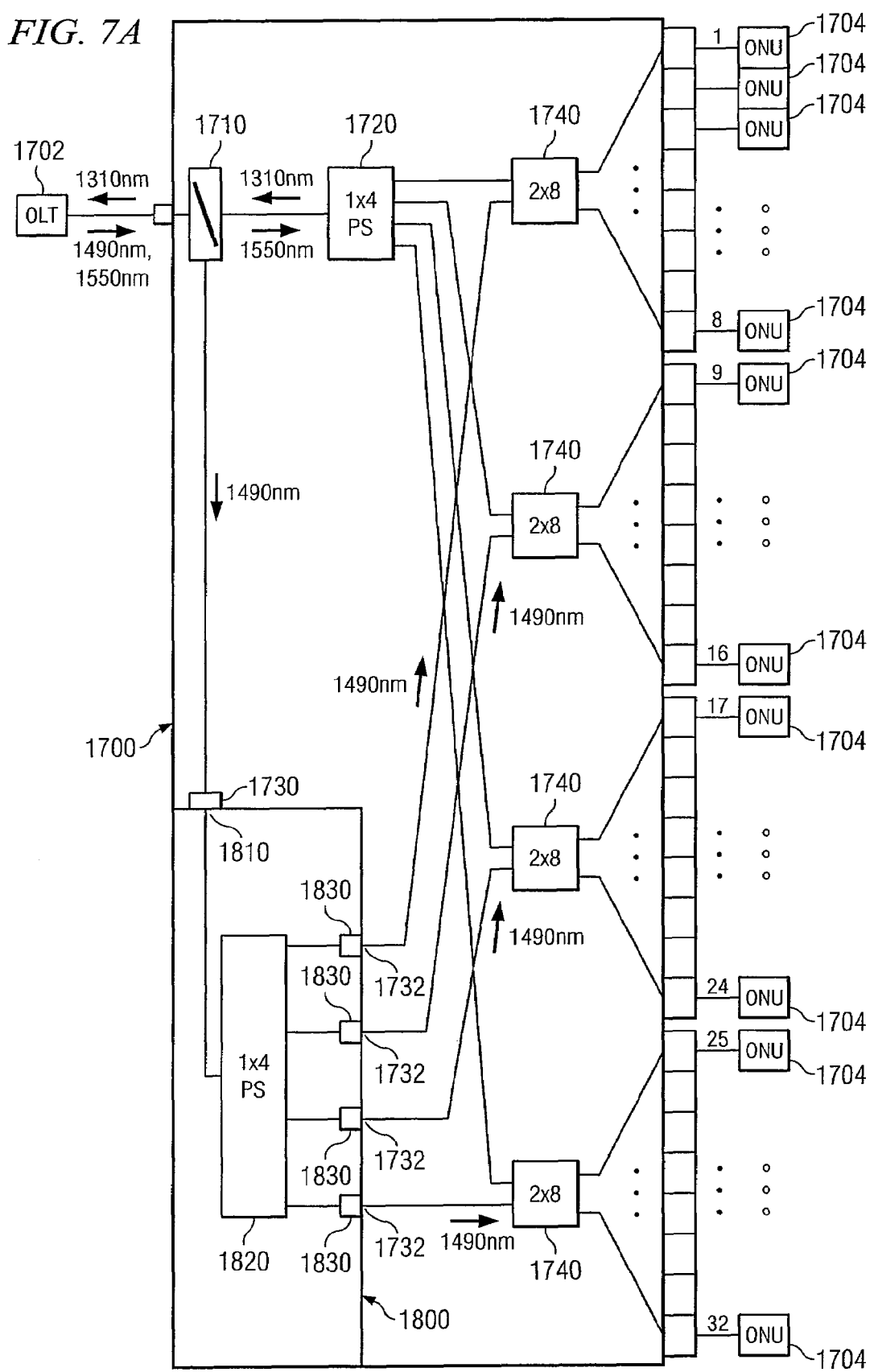
FIGS. 7A and 7B are diagrams illustrating an example upgradeable traffic distribution module and associated pluggable traffic routing modules.
Figure 7B:
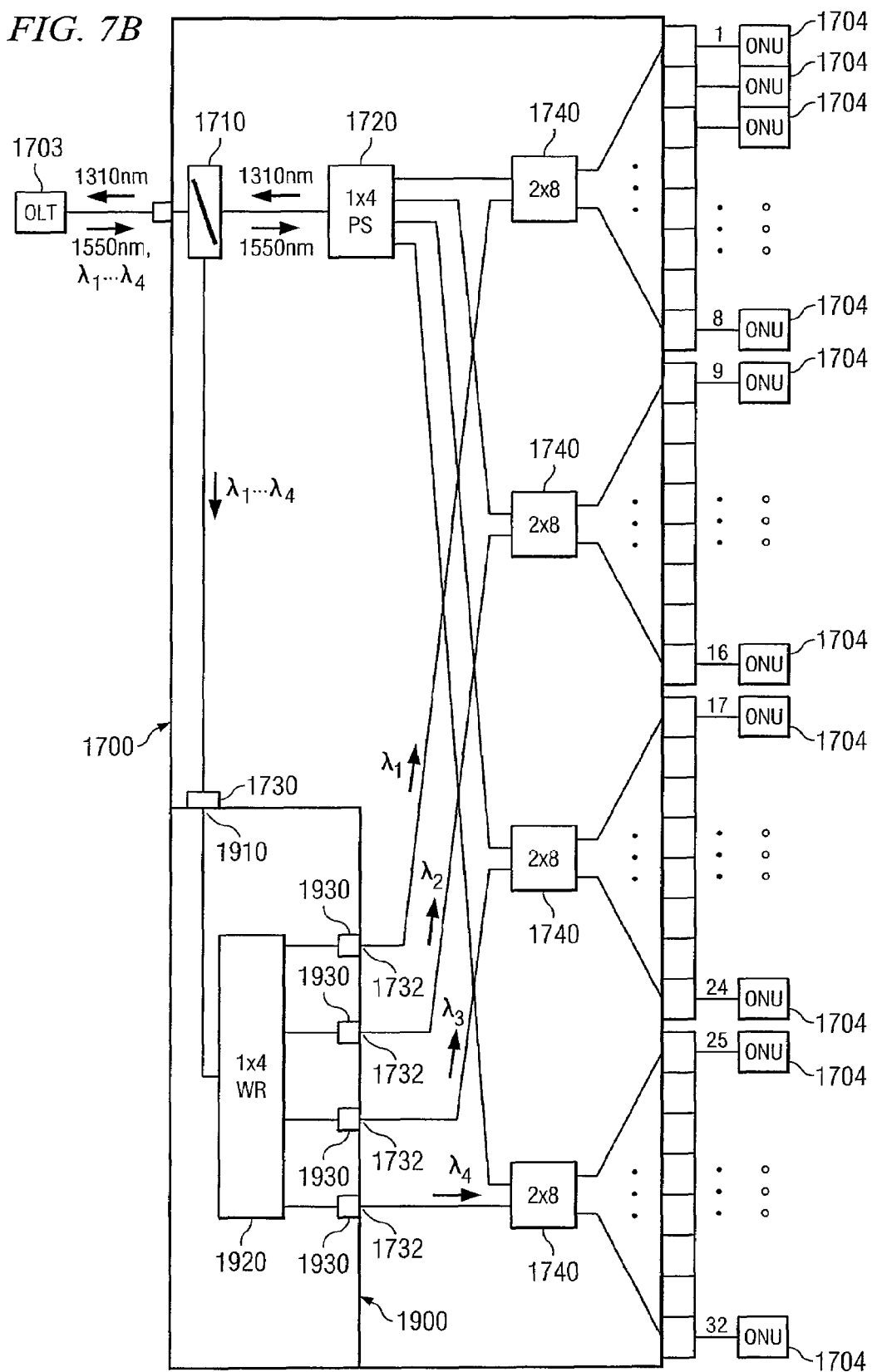

FIGS. 7A and 7B are diagrams illustrating an example upgradeable traffic distribution module 1700 and associated pluggable traffic routing modules 1800 and 1900, respectively. As illustrated in FIG. 7A, coupling pluggable module 1800 to upgradeable traffic distribution module 1700 may provide a PSPON RN, where downstream traffic in $\lambda_v$ and $\lambda_d$ is broadcast to all ONUs. As illustrated in FIG. 7B, coupling pluggable module 1900 to upgradeable traffic distribution module 1700 may provide an HPON RN, where downstream traffic in $\lambda_v$ is broadcast to all ONUs and downstream traffic in $\lambda_d$ is routed as one of $\lambda_1$-$\lambda_4$ to particular ONUs. In this way, $\lambda_d$ may be reused as a WDM wavelength after the upgrade from PSPON to HPON. In addition, many of the RN components (i.e., the components of traffic distribution module 1700) may also be reused.

In FIG. 7A, example upgradeable traffic distribution module 1700 is coupled to OLT 1702 and ONUs 1704. OLT 1702 may comprise any suitable transmitter(s) and receiver(s) operable to transmit downstream traffic at $\lambda_v$ and $\lambda_d$ and receive and process upstream traffic in $\lambda_u$. Each ONU 1704 may comprise any suitable ONU or ONT operable to transmit upstream traffic at time-shared $\lambda_u$ and receive and process downstream traffic in $\lambda_v$ and $\lambda_d$. In particular embodiments, OLT 1702 and ONUs 1704 may be the same as OLT 420 and ONUs 450, respectively, described above in conjunction with FIG. 5.

It should be noted that, in particular GPON embodiments (in accordance with the GPON ITU-T G.984 standard), $\lambda_d$ may comprise a wavelength band centered around 1490 nm, $\lambda_v$ may comprise a wavelength band centered around 1550 nm, and $\lambda_u$ may comprise a wavelength band centered around 1310 nm. It should further be noted that, although OLT 1702 is operable to transmit downstream traffic at two broadcast wavelengths, $\lambda_d$ and $\lambda_v$, OLT 1702 may transmit downstream traffic at any suitable number of broadcast wavelengths, including, for example, only $\lambda_d$. It should further be noted that although upstream traffic is illustrated as carried in one wavelength, $\lambda_u$, upstream traffic may be carried in any suitable number of wavelengths in alternative embodiments.

Example upgradeable traffic distribution module 1700 comprises filter 1710, primary power splitter 1720, connectors 1730 and 1732, and secondary power splitters 1740. Filter 1710 comprises any suitable filter operable to direct traffic in $\lambda_v$ to primary power splitter 1720 and to direct traffic in $\lambda_d$ to connector 1730. In alternative embodiments, filter 1710 may be operable to direct any suitable PSPON downstream broadcast wavelength that is to be reused as a WDM wavelength after an upgrade to HPON or WDMPON to connector 1730. Filter 1710 may also be operable to direct any suitable PSPON downstream broadcast wavelength that is to be broadcast after an upgrade to HPON or WDMPON to primary power splitter 1720. Filter 1710 may also be operable to direct any suitable WDM wavelengths (to be routed after the HPON or WDMPON upgrade) to connector 1730, including, for example, $\lambda_1$-$\lambda_4$ in FIG. 7B, where one of $\lambda_1$-$\lambda_4$ may be a reused PSPON wavelength such as $\lambda_d$. In the upstream direction, filter 1710 may be operable to receive traffic in $\lambda_u$ (or any other upstream wavelength(s)) from primary power splitter 1720 and direct this traffic to OLT 1702. When upgradeable traffic distribution module 1700 is coupled to particular pluggable traffic routing modules, filter 1710 may also be operable to receive upstream traffic in any suitable wavelength from connector 1730. For example, when upgradeable traffic distribution module 1700 is coupled to pluggable module 1800, filter 1710 may be operable to receive upstream traffic in $\lambda_u$ from connector 1730. Filter 1710 may be operable to terminate this duplicate copy of traffic in $\lambda_u$ in any suitable manner.

Primary power splitter 1720 comprises any suitable power splitter, such as, for example, a 1×N coupler or an M×N coupler. In the illustrated embodiment, primary power splitter 1720 comprises a 1×4 coupler. Primary power splitter 1720 is operable to receive traffic in $\lambda_v$ from filter 1710, split the traffic into a suitable number of copies, and forward each copy to a corresponding secondary power splitter 1740. In the upstream direction, primary power splitter 1720 is operable to receive traffic in $\lambda_u$ from secondary power splitters 1740, combine the traffic into one signal, and forward the signal to filter 1710.

Connector 1730 may comprise any suitable fiber lead, plug, or any other suitable connector operable to be coupled in any suitable manner to a pluggable traffic routing module, such as, for example, pluggable module 1800 and/or pluggable module 1900 and to connect such a module to the fiber coupled to filter 1710. Connector 1730 is further operable to receive downstream traffic in broadcast wavelength $\lambda_d$ (or any other suitable broadcast wavelength to be reused as a WDM wavelength after an upgrade to HPON or WDMPON) and/or, after an upgrade to HPON or WDMPON, to receive downstream traffic in WDM wavelengths. Connector 1730 is further operable to suitably forward the downstream traffic to the coupled traffic routing module. When traffic distribution module 1700 is coupled to particular pluggable traffic routing modules, connector 1730 may also be operable to receive upstream traffic in any suitable wavelength and forward the traffic to filter 1710. For example, when upgradeable traffic distribution module 1700 is coupled to module 1800, connector 1730 may be operable to receive upstream traffic in $\lambda_u$ and forward the traffic to filter 1710.

Each connector 1732 comprises any suitable fiber lead, plug, or any other suitable connector operable to be coupled in any suitable manner to a pluggable traffic routing module, such as, for example, pluggable module 1800 and/or pluggable module 1900 and to connect such a module to the fibers coupled to power splitters 1740. Connectors 1732 are further operable to receive downstream traffic (broadcast or WDM depending on the coupled traffic routing module) from the pluggable traffic routing module and forward the traffic to secondary power splitters 1740. For example, in FIG. 7A, each connector 1732 is operable to receive a copy of the traffic in broadcast $\lambda_d$ from module 1800 and forward the copy to a corresponding secondary power splitter 1740. In FIG. 7B, each connector 1732 is operable to receive traffic in a corresponding one of WDM wavelengths $\lambda_1$-$\lambda_4$, where one of $\lambda_1$-$\lambda_4$ may be reused wavelength $\lambda_d$, and forward the traffic to a corresponding secondary power splitter 1740. In the upstream direction, connectors 1732 may be operable to receive upstream traffic in $\lambda_u$ from secondary power splitters 1740 and forward the traffic received to the coupled traffic routing module.

Each secondary power splitter 1740 may comprise any suitable coupler or combination of couplers, such as, for example, an M×N coupler. In the illustrated embodiment, each secondary power splitter 1740 comprises a 2×8 coupler. Each secondary power splitter 1740 is operable to receive a copy of downstream traffic from primary power splitter 1720, such as, for example, $\lambda_v$. Each secondary power splitter 1740 is further operable to receive any downstream traffic (broadcast or WDM, depending on the pluggable traffic routing module) from connectors 1732. For example, in FIG. 7A, each secondary power splitter 1740 is operable to receive a copy of traffic in $\lambda_d$ from a corresponding connector 1732. In FIG. 7B, each secondary power splitter 1740 is operable to receive traffic in a corresponding one of $\lambda_1$-$\lambda_4$ from a corresponding connector 1732, where one of $\lambda_1$-$\lambda_4$ may be reused wavelength $\lambda_d$.

Each secondary power splitter 1740 is further operable to combine downstream traffic from primary power splitter 1720 and from a corresponding connector 1732 into one signal, split the combined signal into a suitable number of copies, and forward each copy to particular downstream ONUs. In particular embodiments, each secondary power splitter 1740 may forward copies to ONUs in a corresponding group of wavelength-sharing ONUs (i.e., in WS-HPON if downstream WDM signals are being transmitted). Although in the illustrated embodiment, each power splitter 1740 is coupled to eight ONUs, in alternative embodiments, each splitter 1740 may be coupled to any suitable number of ONUs. In addition, each 2×8 power splitter may comprise any suitable number of power splitters, and additional power splitters and ONUs may be added to the PON. In particular embodiments, each secondary power splitter 1740 may forward a copy to only one corresponding ONU (i.e., in some HPONs or WDMPON if downstream WDM signals are being transmitted). In these alternative embodiments, each secondary power splitter 1740 may be a 2×1 coupler, and each secondary power splitter 1740 may not split the received downstream signal before forwarding the signal to a corresponding ONU 1750.

In the upstream direction, each secondary power splitter 1740 is operable to receive upstream traffic from downstream ONUs 1704 coupled to the power splitter 1740, combine the traffic into one signal, and forward a copy of the signal to power splitter 1720. In particular embodiments, downstream ONUs 1704 may time-share upstream transmission at one wavelength, $\lambda_u$, as illustrated. Each secondary power splitter 1740 may also forward a copy of the combined signal to a corresponding connector 1732 (as a by-product of being coupled to the corresponding connector 1732 for downstream traffic).

In FIG. 7A, pluggable traffic routing module 1800 may comprise connector 1810, power splitter 1820, and connectors 1830. Pluggable module 1800 may be operable to couple to traffic distribution module 1700 and facilitate the broadcast of traffic in $\lambda_d$. Connector 1810 may comprise any suitable fiber lead, plug, or any other suitable connector operable to be coupled in any suitable manner to connector 1730 of traffic distribution module 1700. Connector 1810 is further operable to receive downstream traffic in broadcast wavelength $\lambda_d$ (or any other suitable broadcast wavelength to be reused as a WDM wavelength after an upgrade to HPON or WDMPON) from connector 1730. Connector 1810 is also operable to forward the received traffic to power splitter 1820. Connector 1810 may also be operable to receive upstream traffic in $\lambda_u$ from power splitter 1820 and forward the traffic to connector 1730.

Power splitter 1820 may comprise any suitable power splitter, such as, for example, a 1×N coupler or an M×N coupler. In the illustrated embodiment, power splitter 1820 comprises a 1×4 coupler. Power splitter 1820 is operable to receive traffic in $\lambda_d$ (or any other suitable broadcast wavelength to be reused as a WDM wavelength after an upgrade to HPON or WDMPON) from connector 1810, split the traffic into a suitable number of copies, and forward each copy to a corresponding connector 1830.

Each connector 1830 may comprise any suitable fiber lead, plug, or any other suitable connector operable to be coupled in any suitable manner to a corresponding connector 1732 of traffic distribution module 1700. Each connector 1830 is further operable to receive a copy of downstream traffic in broadcast wavelength $\lambda_d$ (or any other suitable broadcast wavelength to be reused as a WDM wavelength after an upgrade to HPON or WDMPON) from power splitter 1820. Each connector 1830 is further operable to forward the copy to a corresponding one of connectors 1732 in traffic distribution module 1700. Each connector 1830 may also be operable to receive upstream traffic in $\lambda_u$ from a corresponding connector 1732 and forward the traffic to power splitter 1820.

In operation, when pluggable module 1800 is coupled to traffic distribution module 1700, filter 1710 receives downstream traffic in $\lambda_d$ and $\lambda_v$ from OLT 1702, directs traffic in $\lambda_v$ to primary power splitter 1720, and directs traffic in $\lambda_d$ to connector 1730. Primary power splitter 1720 receives the traffic in $\lambda_v$ from filter 1710, splits the traffic into a suitable number of copies, and forwards each copy to a corresponding secondary power splitter 1740. Connector 1730 receives the traffic in $\lambda_d$ and forwards the traffic via connector 1810 of pluggable module 1800 (into which it is plugged) to power splitter 1820. Power splitter 1820 splits the traffic into a suitable number of copies and forwards each copy to a corresponding connector 1830. Each connector 1830 receives the copy of downstream traffic in $\lambda_d$ from power splitter 1820 and forwards the copy via a corresponding one of connectors 1732 in traffic distribution module 1700 to a corresponding secondary power splitter 1740. Each secondary power splitter 1740 receives a copy of downstream traffic in $\lambda_v$ from primary power splitter 1720, receives a copy of traffic in $\lambda_d$ from a corresponding connector 1732, combines the traffic in $\lambda_v$ and $\lambda_d$ into one signal, splits the combined signal into a suitable number of copies, and forwards each copy to particular downstream ONUs 1704. Each ONU 1704 receives and processes the traffic in $\lambda_v$ and $\lambda_d$.

In the upstream direction, each ONU 1704 transmits upstream traffic at time-shared $\lambda_u$ and forwards the traffic to a corresponding secondary power splitter 1740. Each secondary power splitter 1740 receives upstream traffic from corresponding downstream ONUs 1704, combines the traffic into one signal, splits the signal into a suitable number of copies, and forwards a copy to primary power splitter 1720 and a copy to a corresponding connector 1732. Primary power splitter 1720 receives traffic in $\lambda_u$ from secondary power splitters 1740, combines the traffic into one signal, and forwards the signal to filter 1710. Upstream traffic received at module 1800 may pass through the module be terminated at filter 1710 to avoid collision with the same upstream traffic received at filter 1710 from power splitter 1720. OLT 1702 processes upstream traffic in $\lambda_u$ received from power splitter 1720 via filter 1710.

In FIG. 7B, example upgradeable traffic distribution module 1700 is coupled to OLT 1703 and ONUs 1704. OLT 1703 may comprise any suitable transmitter(s) and receiver(s) operable to transmit downstream traffic at $\lambda_v$ and $\lambda_1$-$\lambda_4$ (where one of $\lambda_1$-$\lambda_4$ may be reused $\lambda_d$) and receive and process upstream traffic at $\lambda_u$. Thus, OLT 1703 may be an upgrade from OLT 1702 in particular embodiments. Each ONU 1704 (which may be the same as an ONU 1704 described in conjunction with FIG. 7A) may comprise any suitable ONU or ONT operable to transmit upstream traffic at time-shared $\lambda_u$ and receive and process downstream traffic in $\lambda_v$ and $\lambda_1$-$\lambda_4$. In particular embodiments, OLT 1703 and ONUs 1704 may be the same as OLT 520 and ONUs 550, respectively, described above in conjunction with FIG. 5.

It should be noted that, although OLT 1703 is operable to transmit downstream traffic at four WDM wavelengths, $\lambda_1$-$\lambda_4$ (and reuse only one PSPON broadcast wavelength $\lambda_d$ as a WDM wavelength), OLT 1703 may transmit downstream traffic at any suitable number of WDM wavelengths and may reuse any suitable number of PSPON broadcast wavelengths as WDM wavelengths. It should further be noted that although upstream traffic is illustrated as carried in one wavelength, $\lambda_u$, upstream traffic may be carried in any suitable number of wavelengths in alternative embodiments.

The components of traffic distribution module 1700 have been described above and thus will not be described again. However, it should be noted that, in FIG. 7B, traffic distribution module 1700 is coupled to pluggable module 1900. In particular embodiments, pluggable module 1900 may be replacing pluggable module 1800 after an upgrade to WS-HPON. Coupled to module 1900, traffic distribution module 1700 may be operable to route downstream WDM wavelengths $\lambda_1$-$\lambda_4$ to particular ONUs 2004, and PSPON broadcast wavelength $\lambda_d$ may be reused as one of the WDM wavelengths.

Pluggable module 1900 may comprise connector 1910, wavelength router 1920, and connectors 1930. Connector 1910 may comprise any suitable fiber lead, plug, or any other suitable connector operable to be coupled in any suitable manner to connector 1730 of traffic distribution module 1700. Connector 1910 is further operable to receive downstream traffic in WDM wavelengths $\lambda_1$-$\lambda_4$ (or any other suitable WDM wavelengths) from connector 1730 and forward the received traffic to wavelength router 1920.

Wavelength router 1920 may comprise any suitable wavelength router, such as, for example, a multiplexer. Wavelength router 1920 may comprise a typical 1×N multiplexer. In the illustrated embodiment, wavelength router comprises a 1×4 wavelength router. Wavelength router 1920 may be operable to receive WDM traffic (for example, $\lambda_1$-$\lambda_4$) from connector 1910, demultiplex the constituent wavelengths, and route traffic in each wavelength to a corresponding one of connectors 1930. In the upstream direction, wavelength router 1920 is operable to receive traffic in $\lambda_u$ from connectors 1930 and facilitate termination of the traffic.

Each connector 1930 may comprise any suitable fiber lead, plug, or any other suitable connector operable to be coupled in any suitable manner to a corresponding connector 1732 of traffic distribution module 1700. Each connector 1930 is further operable to receive traffic in a corresponding one of WDM wavelengths $\lambda_1$-$\lambda_4$ from wavelength router 1920 and forward the received traffic to a corresponding one of connectors 1732 in traffic distribution module 1700. Each connector 1930 may also be operable to receive upstream traffic in $\lambda_u$ from a corresponding connector 1732 and forward the traffic to wavelength router 1920.

In operation, pluggable module 1900 may replace pluggable module 1800 after an upgrade from a PSPON to a WS-HPON, and PSPON broadcast wavelength $\lambda_d$ may be reused as a WDM wavelength. When pluggable module 1900 is coupled to traffic distribution module 1700, filter 1710 receives downstream broadcast traffic in $\lambda_v$ and downstream WDM traffic in $\lambda_1$-$\lambda_4$ (where $\lambda_d$ is one of $\lambda_1$-$\lambda_4$) from OLT 1703, directs traffic in $\lambda_v$ to primary power splitter 1720, and directs traffic in $\lambda_1$-$\lambda_4$ to connector 1730. Primary power splitter 1720 receives the traffic in $\lambda_v$ from filter 1710, splits the traffic into a suitable number of copies, and forwards each copy to a corresponding secondary power splitter 1740. Connector 1730 receives the traffic in $\lambda_1$-$\lambda_4$ and forwards the traffic via connector 1910 of pluggable module 1900 (into which it is plugged) to wavelength router 1920. Wavelength router 1920 demultiplexes the constituent wavelengths ($\lambda_1$-$\lambda_4$), and routes traffic in each wavelength to a corresponding one of connectors 1930. Each connector 1930 receives traffic in a corresponding one of $\lambda_1$-$\lambda_4$ from wavelength router 1920 and forwards the received traffic via a corresponding one of connectors 1732 in traffic distribution module 1700 to a corresponding secondary power splitter 1740. Each secondary power splitter 1740 receives a copy of downstream traffic in $\lambda_v$ from primary power splitter 1720, receives a copy of traffic in a corresponding one of $\lambda_1$-$\lambda_4$ from a corresponding connector 1732, combines the traffic into one signal, splits the combined signal into a suitable number of copies, and forwards each copy to particular downstream ONUs 1704. Each ONU 1704 receives and processes the traffic in $\lambda_v$ and a corresponding one of $\lambda_1$-$\lambda_4$.

In the upstream direction, each ONU 1704 transmits upstream traffic at time-shared $\lambda_u$ and forwards the traffic to a corresponding secondary power splitter 1740. Each secondary power splitter 1740 receives upstream traffic from corresponding downstream ONUs 1704, combines the traffic into one signal, splits the signal into a suitable number of copies, and forwards a copy to primary power splitter 1720 and a copy to a corresponding connector 1732. Primary power splitter 1720 receives traffic in $\lambda_u$ from secondary power splitters 1740, combines the traffic into one signal, and forwards the signal to filter 1710. Upstream traffic received at module 1900 may be terminated at wavelength router 1920 (or, alternatively, may pass through the module and be terminated at filter 1710) to avoid collision with the same upstream traffic received at filter 1710 from power splitter 1720. OLT 1703 processes upstream traffic in $\lambda_u$ received from power splitter 1720 via filter 1710.

Modifications, additions, or omissions may be made to the systems and methods described without departing from the scope of the invention. The components of the systems and methods described may be integrated or separated according to particular needs. For example, filter 1710 may be included in pluggable modules 1800 and 1900 and not distribution module 1700. Moreover, the operations of the systems and methods described may be performed by more, fewer, or other components.

Figure 8A:
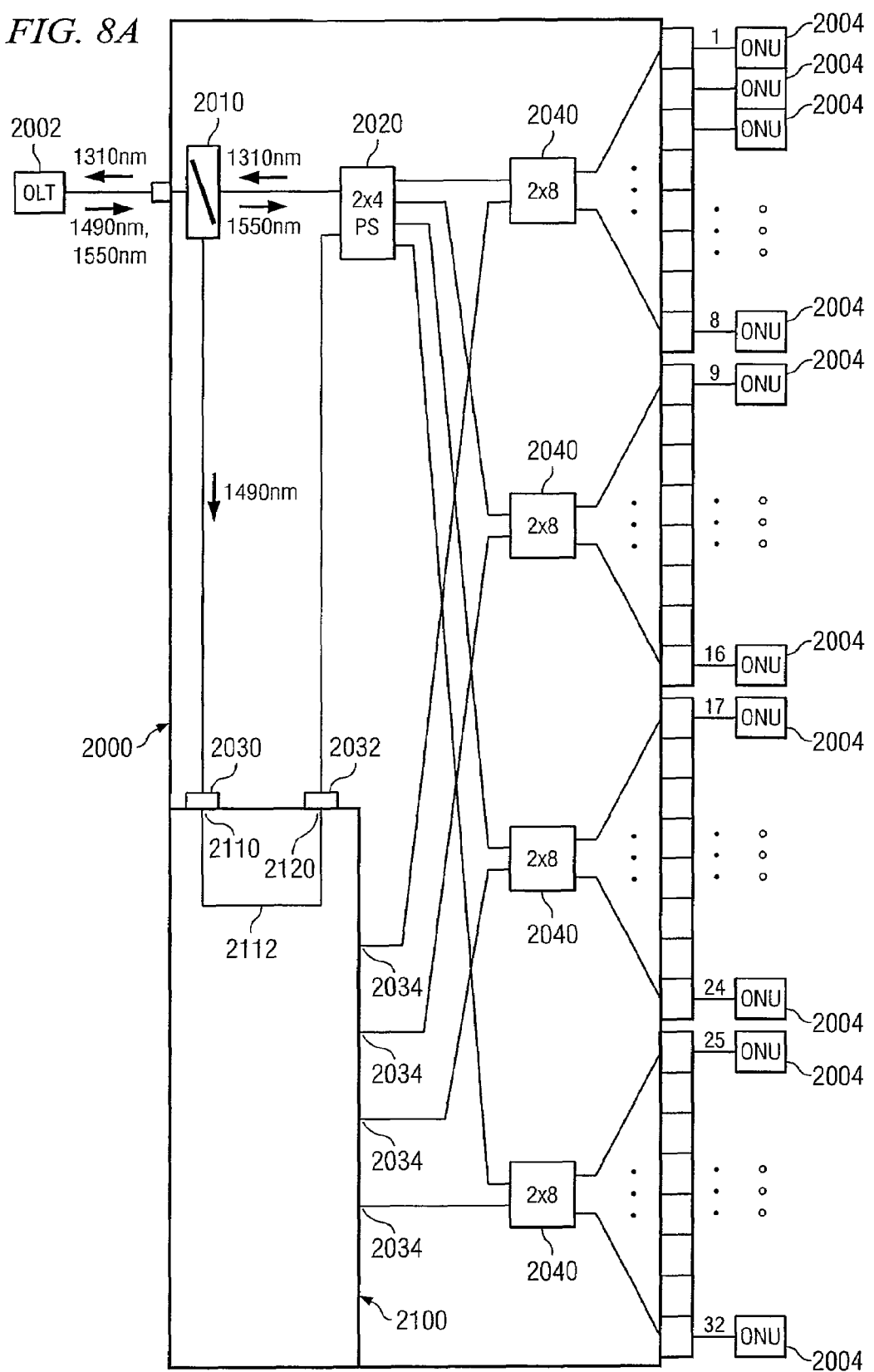
FIGS. 8A and 8B are diagrams illustrating another example upgradeable traffic distribution module and associated pluggable traffic routing modules.
Figure 8B:
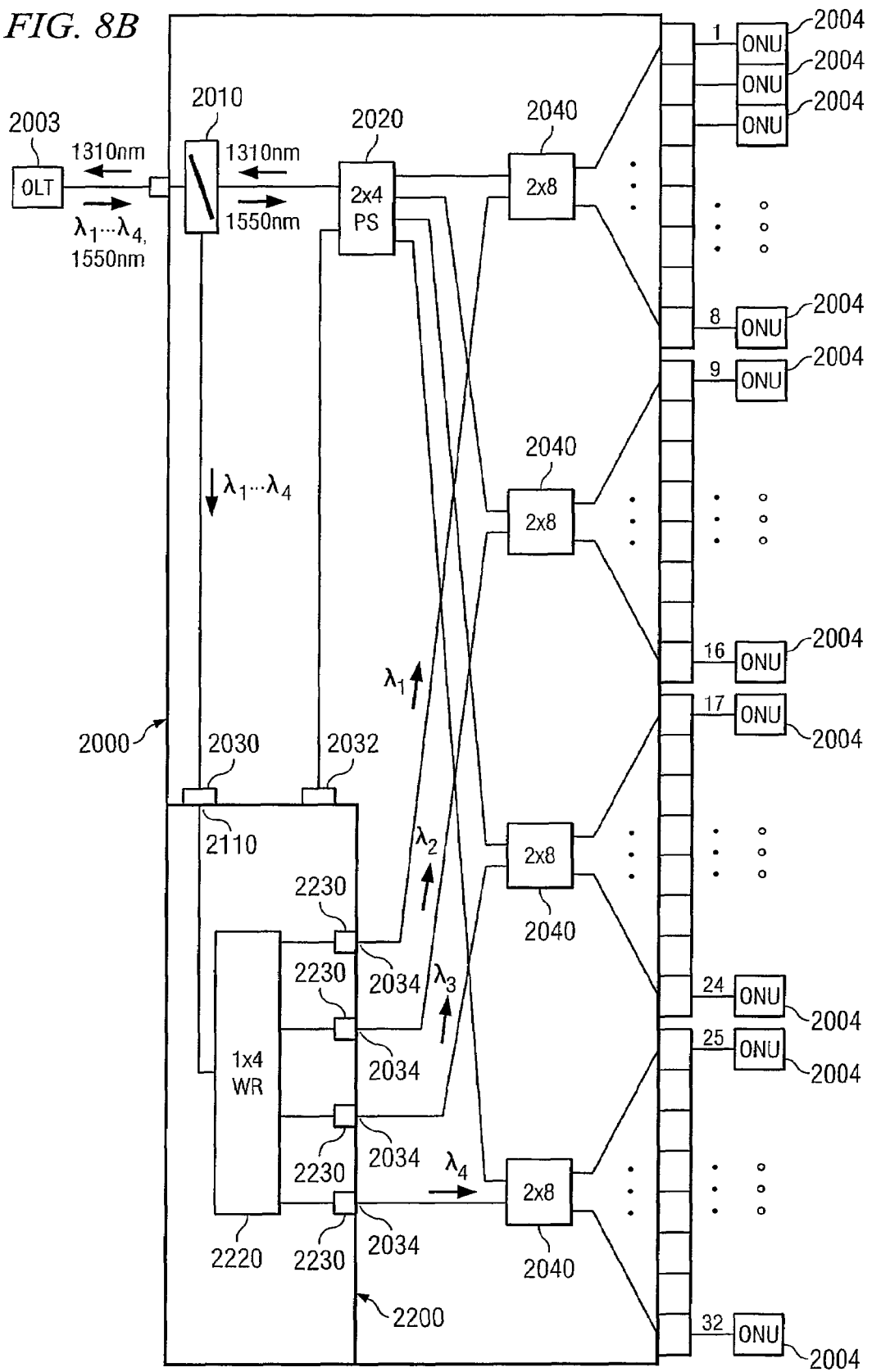

FIGS. 8A and 8B are diagrams illustrating another example upgradeable traffic distribution module 2000 and associated pluggable traffic routing modules 2100 and 2200, respectively. As illustrated in FIG. 8A, coupling pluggable traffic routing module 2100 to upgradeable traffic distribution module 2000 may provide a PSPON RN (and module 2100 need not include a power splitter as does module 1800, described above). As illustrated in FIG. 8B, coupling pluggable traffic routing module 2200 to upgradeable traffic distribution module 2000 may provide an HPON RN, where downstream traffic in $\lambda_v$ is broadcast to all ONUs and downstream traffic in $\lambda_1$-$\lambda_4$ is routed to particular ONUs (where $\lambda_d$ may be one of $\lambda_1$-$\lambda_4$). In this way, $\lambda_d$ may be reused as a WDM wavelength after the upgrade from PSPON to HPON. In addition, many of the RN components (i.e., the components of traffic distribution module 2000) may also be reused.

In FIG. 8A, example upgradeable traffic distribution module 2000 is coupled to OLT 2002 and ONUs 2004. OLT 2002 and ONUs 2004 may be the same as OLT 1702 and ONUs 1704, respectively, and thus will not be described again. In FIG. 8B, example upgradeable traffic distribution module 2000 is coupled to OLT 2203 and ONUs 2004. OLT 2003 may be the same as OLT 1703 and thus will not be described again.

Example upgradeable traffic distribution module 2000 comprises filter 2010, primary power splitter 2020, connectors 2030, 2032, and 2034, and secondary power splitters 2040. Filter 2010, connector 2030, connectors 2034, and secondary power splitters 2040 may be the same as filter 1710, connector 1730, connectors 1732, and secondary power splitters 1740, respectively, and thus will not be described again.

Primary power splitter 2020 may comprise any suitable power splitter, such as, for example, a 2×N coupler or an M×N coupler. In the illustrated embodiment, primary power splitter 2020 comprises a 2×4 coupler. Primary power splitter 2020 is operable to receive, at a first input port, downstream traffic in $\lambda_v$ from filter 2010. Primary power splitter 2020 is further operable to receive, at a second input port, any traffic from connector 2032. For example, when upgradeable traffic distribution module 2000 is coupled to traffic routing module 2100, primary power splitter 2020 may receive downstream traffic in $\lambda_d$ from connector 2032. When upgradeable traffic distribution module 2000 is coupled to traffic routing module 2200, primary power splitter 2020 may receive no traffic from connector 2032. Primary power splitter 2020 is further operable to combine the traffic from filter 2010 and from connector 2032 into one signal, split the signal into a suitable number of copies, and forward each copy to a corresponding secondary power splitter 2040. In the upstream direction, primary power splitter 2020 is operable to receive traffic in $\lambda_u$ from secondary power splitters 2040, combine the traffic into one signal, and forward the signal to filter 2010 and connector 2032. As discussed above in conjunction with filter 1710, filter 2010 may be operable to pass only the upstream traffic it receives from the primary power splitter and terminate any other traffic (such as that forwarded by connector 2032 through module 2100 to filter 2010).

Connector 2032 may comprise any suitable fiber lead, plug, or any other suitable connector operable to be coupled in any suitable manner to a pluggable traffic routing module, such as, for example, pluggable traffic routing module 2100 and/or pluggable traffic routing module 2200 and to connect such a module to the fiber coupled to the second input port of primary power splitter 2020. When coupled to a particular pluggable traffic routing module, connector 2032 is further operable to receive downstream traffic from the traffic routing module. For example, in FIG. 8A, connector 2032 may receive traffic in broadcast signal $\lambda_d$ from connector 2120 of module 2100. In FIG. 8B, connector 2032 may not receive any downstream traffic from module 2200. Connector 2032 is further operable to forward received downstream traffic to primary power splitter 2020. In the upstream direction, connector 2032 is operable to receive traffic in $\lambda_u$ from primary power splitter 2020. When coupled to module 2100, connector 2032 is operable to forward the traffic to connector 2120. When coupled to module 2200, connector 2032 is operable to facilitate termination of the traffic.

In FIG. 8A, pluggable module 2100 may comprise connector 2110, fiber loop 2112, and connector 2120. Connector 2110 may comprise any suitable fiber lead, plug, or any other suitable connector operable to be coupled in any suitable manner to connector 2030 of traffic distribution module 2000. Connector 2110 is further operable to receive downstream traffic in broadcast wavelength $\lambda_d$ (or any other suitable broadcast wavelength to be reused as a WDM wavelength after an upgrade to HPON) from connector 2030. Connector 2110 is further operable to forward the received traffic to fiber loop 2112. In the upstream direction, connector 2110 is operable to receive upstream traffic from fiber loop 2112 (i.e., traffic in $\lambda_u$) and forward the received traffic to connector 2030.

Fiber loop 2112 may comprise any suitable fiber operable to receive downstream traffic from connector 2110 and forward the traffic to connector 2120. Connector 2120 may comprise any suitable fiber lead, plug, or any other suitable connector operable to be coupled in any suitable manner to connector 2032 of traffic distribution module 2000. Connector 2120 is further operable to receive downstream traffic in broadcast wavelength $\lambda_d$ (or any other suitable broadcast wavelength to be reused as a WDM wavelength after an upgrade to HPON) from fiber loop 2112. Connector 2110 is further operable to forward the received traffic to connector 2032. In the upstream direction, connector 2120 is operable to receive upstream traffic (i.e., traffic in $\lambda_u$) from connector 2032 and forward the traffic to fiber loop 2112.

In operation, when pluggable module 2100 is coupled to traffic distribution module 2000, filter 2010 receives downstream traffic in $\lambda_d$ and $\lambda_v$ from OLT 2002, directs traffic in $\lambda_v$ to primary power splitter 2020, and directs traffic in $\lambda_d$ to connector 2030. Connector 2030 receives the traffic in $\lambda_d$ and forwards the traffic via connector 2110 of pluggable module 2100 (into which it is plugged) to fiber loop 2112. Fiber loop 2112 forwards the traffic to connector 2120. Connector 2120 receives the traffic in $\lambda_d$ from fiber loop 2112 and forwards the traffic via connector 2032 of traffic distribution module 2000 to primary power splitter 2020. Primary power splitter 2020 receives downstream traffic in $\lambda_v$ from filter 2010 and downstream traffic in $\lambda_d$ from connector 2032, combines the traffic into one signal, splits the signal into a suitable number of copies, and forwards each copy to a corresponding secondary power splitter 2040. Each secondary power splitter 2040 receives a copy of downstream traffic in $\lambda_v$ and $\lambda_d$ from primary power splitter 2020, splits the copy into a suitable number of copies, and forwards each copy to particular downstream ONUs 2004. Each ONU 2004 receives and processes the traffic in $\lambda_v$ and $\lambda_d$.

In the upstream direction, each ONU 2004 transmits upstream traffic at time-shared $\lambda_u$ and forwards the traffic to a corresponding secondary power splitter 2040. Each secondary power splitter 2040 receives upstream traffic from corresponding downstream ONUs 2004, combines the traffic into one signal, split the signal into a suitable number of copies, and forwards a copy to a corresponding connector 2034 and a copy to primary power splitter 2020. Each connector 2034 receives traffic in $\lambda_u$ from a corresponding secondary power splitter 2040 and facilitates the termination of the traffic.

Primary power splitter 2020 receives traffic in $\lambda_u$ from secondary power splitters 2040, combines the traffic into one signal, splits the signal into two copies, and forwards a copy to filter 2010. Upstream traffic received at module 2100 may pass through the module and be terminated at filter 2010 to avoid collision with the same upstream traffic received at filter 2010 from power splitter 2020. OLT 2002 processes upstream traffic in $\lambda_u$ received from power splitter 2020 via filter 2010.

In FIG. 8B, pluggable module 2200 may comprise connector 2210, wavelength router 2220, and connectors 2230. Connector 2210, wavelength router 2220, and connectors 2230 may be the same as connector 1910, wavelength router 1920, and connectors 1930, respectively, and thus will not be described again.

In operation, pluggable module 2200 may replace pluggable module 2100 after an upgrade from a PSPON to a WS-HPON, and PSPON broadcast wavelength $\lambda_d$ may be reused as a WDM wavelength. When pluggable module 2200 is coupled to traffic distribution module 2000, filter 2010 receives downstream broadcast traffic in $\lambda_v$ and downstream WDM traffic in $\lambda_1$-$\lambda_4$ (where $\lambda_d$ is one of $\lambda_1$-$\lambda_4$) from OLT 2003, directs traffic in $\lambda_v$ to primary power splitter 2020, and directs traffic in $\lambda_1$-$\lambda_4$ to connector 2030. Primary power splitter 2020 receives the traffic in $\lambda_v$ from filter 2010, splits the traffic into a suitable number of copies, and forwards each copy to a corresponding secondary power splitter 2040. Connector 2030 receives the traffic in $\lambda_1$-$\lambda_4$ and forwards the traffic via connector 2210 of pluggable module 2200 (into which it is plugged) to wavelength router 2220. Wavelength router 2220 demultiplexes the constituent wavelengths ($\lambda_1$-$\lambda_4$) and routes traffic in each wavelength to a corresponding one of connectors 2230. Each connector 2230 receives traffic in a corresponding one of $\lambda_1$-$\lambda_4$ from wavelength router 2220 and forwards the received traffic via a corresponding one of connectors 2034 in traffic distribution module 2000 to a corresponding secondary power splitter 2040. Each secondary power splitter 2040 receives a copy of downstream traffic in $\lambda_v$ from primary power splitter 2020, receives a copy of traffic in a corresponding one of $\lambda_1$-$\lambda_4$ from a corresponding connector 2032, combines the traffic into one signal, splits the combined signal into a suitable number of copies, and forwards each copy to particular downstream ONUs 2004. Each ONU 2004 receives and processes the traffic in $\lambda_v$ and a corresponding one of $\lambda_1$-$\lambda_4$.

In the upstream direction, each ONU 2004 transmits upstream traffic at time-shared $\lambda_u$ and forwards the traffic to a corresponding secondary power splitter 2040. Each secondary power splitter 2040 receives upstream traffic from corresponding downstream ONUs 2004, combines the traffic into one signal, splits the signal into a suitable number of copies, and forwards a copy to primary power splitter 2020 and a copy to a corresponding connector 2034. Primary power splitter 2020 receives traffic in $\lambda_u$ from secondary power splitters 2040, combines the traffic into one signal, and forwards the signal to filter 2010. Upstream traffic received at module 2200 may be terminated at wavelength router 2220 (or, alternatively, may pass through the module and be terminated at filter 2010) to avoid collision with the same upstream traffic received at filter 2010 from power splitter 2020. OLT 2003 processes upstream traffic in $\lambda_u$ received from power splitter 2020 via filter 2010.

Modifications, additions, or omissions may be made to the systems and methods described without departing from the scope of the invention. The components of the systems and methods described may be integrated or separated according to particular needs. For example, filter 2010 may be included in pluggable modules 2100 and 2200 and not distribution module 2000. Moreover, the operations of the systems and methods described may be performed by more, fewer, or other components.

Figure 9:
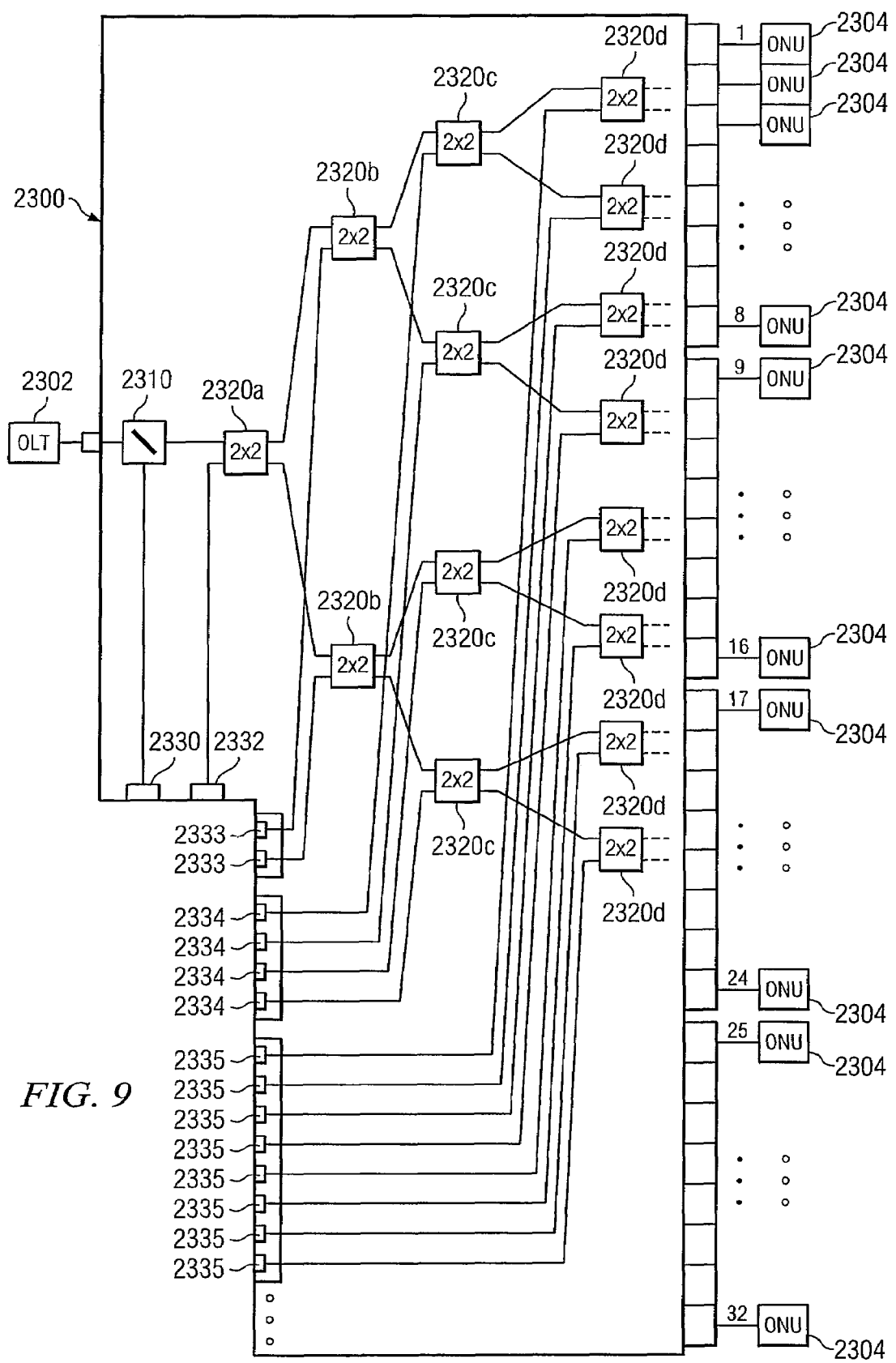
FIG. 9 is a diagram illustrating yet another example upgradeable traffic distribution module.
Figure 10A:
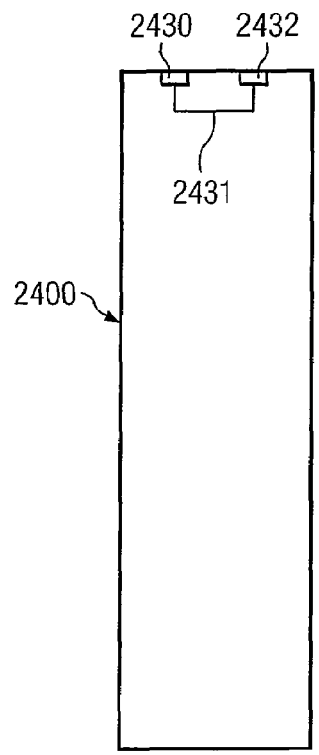
FIGS. 10A, 10B, 10C, 10D, and 10E are diagrams illustrating example traffic routing modules configured to couple to an traffic distribution module, such as the example traffic distribution module of FIG. 9.
Figure 10B:
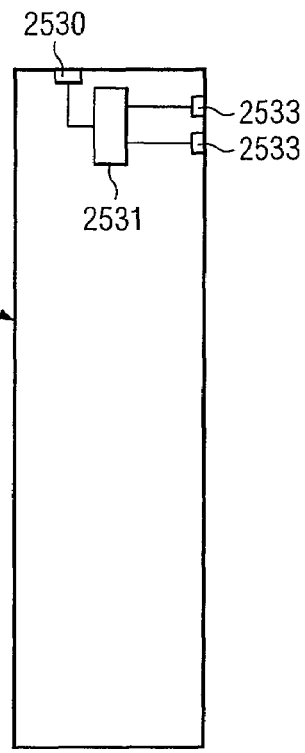
Figure 10C:
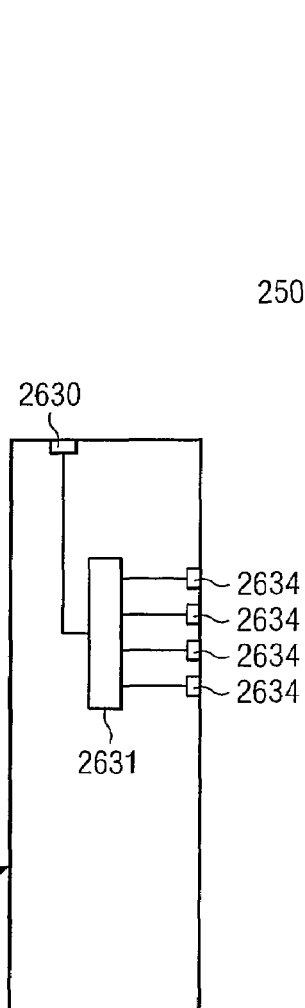
Figure 10D:
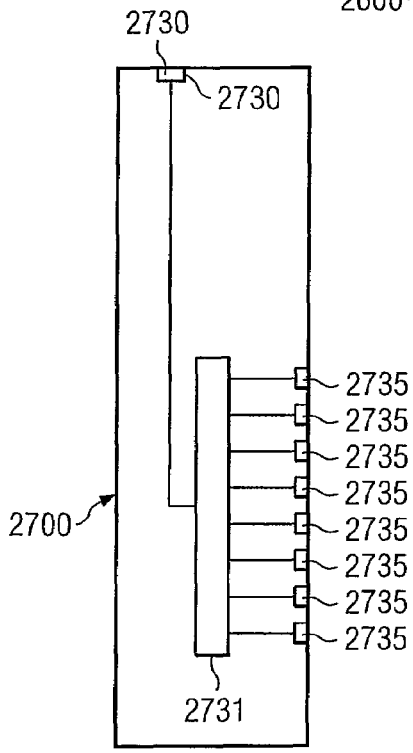
Figure 10E:
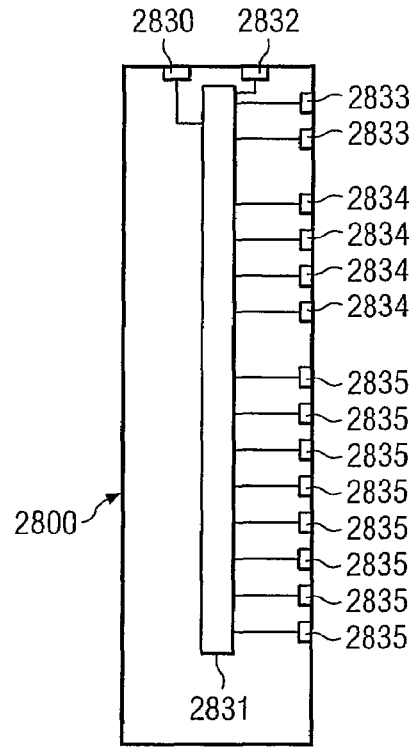

FIG. 9 is a diagram illustrating yet another example upgradeable traffic distribution module 2300. Traffic distribution module 2300 is configured to be coupled to particular pluggable modules to provide an RN suitable for different upgrades in downstream capacity. For example, as described further below, traffic distribution module 2300 may be coupled to pluggable module 2400 of FIG. 10A to provide a PSPON RN. Traffic distribution module 2300 may be coupled to pluggable modules 2500, 2600 and 2700 of FIGS. 10B-16D, respectively, to provide a WS-HPON RN routing two, four, and eight WDM wavelengths, respectively. In alternative embodiments, traffic distribution module 2300 may be coupled to module 2800 of FIG. 16E (which may be fixed to traffic distribution module 2300 and not pluggable in particular embodiments) to provide an RN that can be upgraded in-service from a PSPON RN to a WS-HPON RN routing two, four, or eight WDM wavelengths. In particular embodiments, particular upgrades may reuse one or more PSPON broadcast wavelengths as WDM wavelengths. In addition, many of the RN components (i.e., the components of traffic distribution module 2300) may also be reused.

Example upgradeable traffic distribution module 2300 is coupled to OLT 2302 and ONUs 2304. OLT 2302 comprises any suitable OLT operable to transmit traffic in particular downstream wavelengths (depending on the type of PON) and receive upstream traffic in particular upstream wavelengths. OLT 2302 may, in a particular embodiment, comprise a PSPON OLT operable to transmit downstream traffic at $\lambda_v$ and $\lambda_d$ and receive upstream traffic in $\lambda_u$. In such an embodiment, traffic distribution module 2300 may be coupled to module 2400. In an alternative embodiment, OLT 2302 may comprise a WS-HPON OLT operable to transmit downstream traffic in WDM wavelengths $\lambda_1$ and $\lambda_2$ and optionally in one or more broadcast wavelengths (i.e., $\lambda_v$) and to receive upstream traffic in $\lambda_u$. In such an embodiment, traffic distribution module 2300 may be coupled to module 2500 to produce a suitable RN. In another alternative embodiment, OLT 2302 may comprise a WS-HPON OLT operable to transmit downstream traffic in WDM wavelengths $\lambda_1$-$\lambda_4$ and optionally in one or more broadcast wavelengths (i.e., $\lambda_v$) and to receive upstream traffic in $\lambda_u$. In such an embodiment, traffic distribution module 2300 may be coupled to module 2600 to produce a suitable RN. In yet another alternative embodiment, OLT 2302 may comprise a WS-HPON OLT operable to transmit downstream traffic in WDM wavelengths $\lambda_1$-$\lambda_8$ and optionally in one or more broadcast wavelengths (i.e., $\lambda_v$) and to receive upstream traffic in $\lambda_u$. In such an embodiment, traffic distribution module 2300 may be coupled to module 2700 to produce a suitable RN. In yet another alternative embodiment, traffic distribution module 2300 may be coupled to module 2800 to produce a suitable RN configured to be upgraded in-service to and from any one of a PSPON RN, a two-WDM wavelength WS-HPON RN, a four-WDM wavelength WS-HPON RN, and an eight-WDM wavelength WS-HPON RN. ONUs 2004 may be the same as ONUs 1704, described above, and thus will not be described again.

Example upgradeable traffic distribution module 2300 comprises filter 2310, power splitters 2320a, 2320b, 2320c, and 2320*d*, and connectors 2330, 2332, 2333, 2334, and 2335. Filter 2310 may be the same as filter 2010 and thus will not be described again.

Power splitters 2320*a*, 2320*b*, 2320*c* and 2320*d* may comprise any suitable 2×2 couplers or combination of couplers comprising two input ports and two output ports. Each coupler is operable to receive zero, one, or two downstream signals from any suitable source or sources, combine the two downstream signals into one downstream signal, split the combined downstream signal into two copies, and forward the two copies to suitable destinations. Each coupler is also operable to receive zero, one, or two upstream signals from any suitable source or sources, combine the two upstream signals into one upstream signal, split the combined upstream signal into two copies, and forward the two copies to suitable destinations. It should be noted that, in particular embodiments, except for the additional fiber connections coupling splitters 2320 to corresponding connectors 2332, 2333, 2334, and 2335, splitters 2320 may be integrated on a chip in a similar manner as an example 2×N circuit is integrated.

Power splitter 2320*a* is coupled to filter 2310 at one input port, connector 2320*a* at another input port, and power splitters 2320*b* at the two output ports. Each power splitter 2320*b* is coupled to power splitter 2320*a* at one input port, a corresponding connector 2333 at another input port, and corresponding power splitters 2320*c* at the two output ports. Each power splitter 2320*c* is coupled to a corresponding power splitter 2320*b* at one input port, a corresponding connector 2334 at another input port, and corresponding power splitters 2320*d* at the two output ports. Each power splitter 2320*d* is coupled to a corresponding power splitter 2320*c* at one input port and a corresponding connector 2335 at another input port. Each power splitter 2320*d* may be coupled to additional corresponding downstream power splitters (i.e., splitters 2320*e*, not illustrated) at the two output ports (and these additional splitters may also be coupled to corresponding module connectors at corresponding input ports and to ONUs 2304 at output ports). Power splitters 2320*d* may alternatively be coupled to ONUs 2304 at the output ports.

It should be noted that power splitters 2320*a-b* may be similar to primary power splitter 2020, described above. However, power splitters 2320*a-b* comprise a different number of leads coupling the splitters to module connectors than does primary power splitter 2020. Power splitters 2320*c-d* may be similar to power splitters 2040, described above. However, a third set of splitters 2320 (i.e., a 2320*e* set) may be required to split traffic received at each splitter 2320*c* into eight copies (as does each power splitter 2040). In addition, power splitters 2320*c-d* comprise a different number of leads coupling the splitters to module connectors than do secondary power splitters 2040.

Each connector 2330, 2332, 2333, 2334, and 2335 may comprise any suitable fiber lead, plug, or any other suitable connector operable to be coupled in any suitable manner to a corresponding component of traffic distribution module 2300 and to a suitable connector of a pluggable module. Connector 2330 may be coupled to filter 2310, connector 2332 may be coupled to power splitter 2320*a*, connectors 2333 may be coupled to corresponding power splitters 2320*b*, connectors 2334 may be coupled to corresponding power splitters 2320*c*, and connectors 2335 may be coupled to corresponding power splitters 2320*d*. It should be noted that any suitable number of sets of connectors comprising any suitable number of connectors may be included in section 2300 (and coupled to corresponding sets of power splitters 2320). For example, another set of sixteen connectors may be included and coupled to the set of power splitters 2320*e* (not illustrated).

The operation of upgradeable RN is described below in conjunction with FIGS. 10A-10E.

FIGS. 10A, 10B, 10C, 10D, and 10E are diagrams illustrating example traffic routing modules 2400-2800 configured to couple to a traffic distribution module, such as the example traffic distribution module 2300 of FIG. 9. Module 2400 comprises connector 2430 fiber loop 2431, and connector 2432. Connector 2430, fiber loop 2431, and connector 2432 may be the same as connector 2110, fiber loop 2112, and connector 2120, respectively, and thus will not be described again.

Module 2500 comprises connector 2530, wavelength router 2531, and connectors 2533. Connector 2530 may comprise any suitable fiber lead, plug, or any other suitable connector operable to be coupled in any suitable manner to connector 2330 of traffic distribution module 2300 and to wavelength router 2531. Wavelength router 2531 may comprise any suitable wavelength router, such as, for example, a multiplexer, operable to receive a downstream signal from connector 2530, demultiplex the signal into its constituent wavelengths, and forward traffic in each wavelength to a corresponding connector 2533. In the upstream direction, wavelength router 2531 may be operable to facilitate the termination of upstream traffic. In the illustrated embodiment, wavelength router 2531 comprises a 1×2 demultiplexer. Each connector 2533 may comprise any suitable fiber lead, plug, or any other suitable connector. Each connector 2533 may be coupled in any suitable manner to a corresponding connector 2333 of traffic distribution module 2300 and to a corresponding output port of wavelength router 2531.

Module 2600 comprises connector 2630, wavelength router 2631, and connectors 2634. Connector 2630 may comprise any suitable fiber lead, plug, or any other suitable connector operable to be coupled in any suitable manner to connector 2330 of traffic distribution module 2300 and to wavelength router 2631. Wavelength router 2631 may comprise any suitable wavelength router, such as, for example, a multiplexer, operable to receive a downstream signal from connector 2530, demultiplex the signal into its constituent wavelengths, and forward traffic in each wavelength to a corresponding connector 2634. In the upstream direction, wavelength router 2631 may be operable to facilitate the termination of upstream traffic. In the illustrated embodiment, wavelength router 2631 comprises a 1×4 demultiplexer. Each connector 2634 may comprise any suitable fiber lead, plug, or any other suitable connector. Each connector 2634 may be coupled in any suitable manner to a corresponding connector 2334 of traffic distribution module 2300 and to a corresponding output port of wavelength router 2631.

Module 2700 comprises connector 2730, wavelength router 2731, and connectors 2735. Connector 2730 may comprise any suitable fiber lead, plug, or any other suitable connector operable to be coupled in any suitable manner to connector 2330 of traffic distribution module 2300 and to wavelength router 2631. Wavelength router 2731 may comprise any suitable wavelength router, such as, for example, a multiplexer, operable to receive a downstream signal from connector 2730, demultiplex the signal into its constituent wavelengths, and forward traffic in each wavelength to a corresponding connector 2735. In the upstream direction, wavelength router 2731 may be operable to facilitate the termination of upstream traffic. In the illustrated embodiment, wavelength router 2731 comprises a 1×8 demultiplexer. Each connector 2735 may comprise any suitable fiber lead, plug, or any other suitable connector. Each connector 2735 may be coupled in any suitable manner to a corresponding connector 2335 of traffic distribution module 2300 and to a corresponding output port of wavelength router 2731.

Module 2800 comprises connector 2830, wavelength router 2831, and connectors 2832, 2833, 2834, and 2835. Connector 2830 may comprise any suitable fiber lead, plug, or any other suitable connector operable to be coupled in any suitable manner to connector 2330 of traffic distribution module 2300 and to wavelength router 2831. Wavelength router 2831 may comprise any suitable wavelength router, such as, for example, a multiplexer, operable to receive a downstream signal from connector 2830, demultiplex the signal into its constituent wavelengths, and forward traffic in each wavelength to a corresponding connector in sets 2832, 2833, 2834, or 2835. In the upstream direction, wavelength router 2831 may be operable to facilitate the termination of upstream traffic. In the illustrated embodiment, wavelength router 2831 comprises a 1×5 demultiplexer. Each connector in sets 2832, 2833, 2834, and 2835 may comprise any suitable fiber lead, plug, or any other suitable connector. Each connector 2832 may be coupled in any suitable manner to a corresponding connector 2332 of traffic distribution module 2300 and to a corresponding output port of wavelength router 2831. Each connector 2833 may be coupled in any suitable manner to a corresponding connector 2333 of traffic distribution module 2300 and to a corresponding output port of wavelength router 2831. Each connector 2834 may be coupled in any suitable manner to a corresponding connector 2334 of traffic distribution module 2300 and to a corresponding output port of wavelength router 2831. Each connector 2835 may be coupled in any suitable manner to a corresponding connector 2335 of traffic distribution module 2300 and to a corresponding output port of wavelength router 2831.

In operation, when pluggable module 2400 is coupled to traffic distribution module 2300, filter 2310 receives downstream traffic in $\lambda_d$ and $\lambda_v$ from OLT 2302, directs traffic in $\lambda_v$ to power splitter 2320a, and directs traffic in $\lambda_d$ to connector 2330. Connector 2330 receives the traffic in $\lambda_d$ and forwards the traffic via connector 2430 of pluggable module 2400 (into which it is plugged) to fiber loop 2431. Fiber loop 2431 forwards the traffic to connector 2432. Connector 2432 receives the traffic in $\lambda_d$ from fiber loop 2432 and forwards the traffic via connector 2332 of traffic distribution module 2300 to power splitter 2320a.

Power splitter 2320a receives downstream traffic in $\lambda_v$ from filter 2310 and downstream traffic in $\lambda_d$ from connector 2332, combines the traffic into one signal, splits the signal into a suitable number of copies, and forwards each copy to a corresponding power splitter 2320b. Each power splitter 2320b receives a copy of downstream traffic in $\lambda_v$ and $\lambda_d$ from power splitter 2320 (and no traffic from corresponding connector 2333), splits the copy into a suitable number of copies, and forwards each resulting copy to a corresponding power splitter 2320c. Each power splitter 2320c receives a copy of downstream traffic in $\lambda_v$ and $\lambda_d$ from power splitter 2320b (and no traffic from corresponding connector 2334), splits the copy into a suitable number of copies, and forwards each resulting copy to corresponding power splitter 2320d. Each power splitter 2320d receives a copy of downstream traffic in $\lambda_v$ and $\lambda_d$ from power splitter 2320c (and no traffic from corresponding connector 2335), splits the copy into a suitable number of copies, and forwards each resulting copy to additional downstream power splitters (i.e., 2320e, which process received traffic analogously to upstream power splitters) or directly to ONUs 2304. Each ONU 2304 receives and processes the traffic in $\lambda_v$ and $\lambda_d$.

In the upstream direction, each ONU 2304 transmits upstream traffic at time-shared $\lambda_u$ and forwards the traffic to a corresponding power splitter (i.e., 2320d). Each power splitter 2320d receives upstream traffic from corresponding downstream ONUs 2304, combines the traffic into one signal, splits the signal into a suitable number of copies, and forwards a copy to power splitter 2320c. Power splitters 2320 forward traffic in $\lambda_u$ to upstream splitters until the traffic in $\lambda_u$ is received by power splitter 2320a. Connectors 2335, 2334 and 2333 receiving copies of the upstream traffic facilitate the termination of the copies they receive. Power splitter 2320a receives the traffic in $\lambda_u$, combines the traffic into one signal, splits the signal into two copies, and forwards one copy to connector 2332 and one copy to filter 2310. Upstream traffic received at module 2400 may pass through the module and be terminated at filter 2310 to avoid collision with the same upstream traffic received at filter 2310 from power splitter 2320a. OLT 2302 processes upstream traffic in $\lambda_u$ received from power splitter 2320a via filter 2310.

Pluggable module 2500 may, for example, replace pluggable module 2400 after an upgrade from a PSPON to a WS-HPON routing two WDM wavelengths. When pluggable module 2500 is coupled to traffic distribution module 2300, filter 2310 receives downstream traffic in $\lambda_v$ and $\lambda_1$-$\lambda_2$ (one of which may be reused PSPON wavelength $\lambda_d$) from OLT 2302, directs traffic in $\lambda_v$ to power splitter 2320a, and directs traffic in $\lambda_1$-$\lambda_2$ to connector 2330. Power splitter 2320a receives the traffic in $\lambda_v$ from filter 2310 (and no traffic from connector 2332), splits the received traffic into a suitable number of copies, and forwards each copy to a corresponding power splitter 2320b. Connector 2330 receives the traffic in $\lambda_1$-$\lambda_2$ and forwards the traffic via connector 2530 of pluggable module 2500 (to which it is plugged) to wavelength router 2531. Wavelength router 2531 demultiplexes the constituent wavelengths ($\lambda_1$-$\lambda_2$) and routes traffic in each wavelength to a corresponding one of connectors 2533. Each connector 2533 receives traffic in a corresponding one of $\lambda_1$-$\lambda_2$ from wavelength router 2531 and forwards the received traffic via a corresponding one of connectors 2333 in traffic distribution module 2300 to a corresponding power splitter 2320b.

Each power splitter 2320b receives a copy of downstream traffic in $\lambda_v$ from power splitter 2320a and downstream traffic in a corresponding one of $\lambda_1$ and $\lambda_2$ from a corresponding connector 2333, combines the traffic into one signal, splits the signal into a suitable number of copies, and forwards each copy to a corresponding power splitter 2320c. Each power splitter 2320c receives a copy from power splitter 2320b (and no traffic from corresponding connector 2334), splits the copy into a suitable number of copies, and forwards each resulting copy to corresponding power splitter 2320d. Each power splitter 2320d receives a copy from power splitter 2320c (and no traffic from corresponding connector 2335), splits the copy into a suitable number of copies, and forwards each resulting copy to additional downstream power splitters (i.e., 2320e which process received traffic analogously to upstream power splitters) or directly to ONUs 2304. Each ONU 2304 receives and processes the traffic in $\lambda_v$ and a corresponding one of $\lambda_1$-$\lambda_2$. In this way, module 2500 may be coupled to traffic distribution module 2300 to allow each group of wavelength sharing ONUs to share a wavelength in a WS-HPON, where one of the WDM wavelengths may be reused PSPON wavelength $\lambda_d$. Optionally, all ONUs may also receive broadcast traffic in $\lambda_v$.

In the upstream direction, each ONU 2304 transmits upstream traffic at time-shared $\lambda_u$ and forwards the traffic to a corresponding power splitter (i.e., 2320d). Each power splitter 2320d receives upstream traffic from corresponding downstream ONUs 2304, combines the traffic into one signal, splits the signal into a suitable number of copies, and forwards a copy to power splitter 2320c. Power splitters 2320 forward traffic in $\lambda_u$ to upstream splitters until the traffic in $\lambda_u$ is received by power splitter 2320a. Power splitter 2320a receives the traffic in $\lambda_u$, combines the traffic into one signal, splits the signal into two copies, and forwards a copy to filter 2310. Connectors 2335, 2334, and 2332 receiving copies of the upstream traffic facilitate the termination of the copies they receive. Upstream traffic received at module 2500 may be terminated at wavelength router 2531 (or, alternatively, may pass through the module and be terminated at filter 2310) to avoid collision with the same upstream traffic received at filter 2310 from power splitter 2320a. OLT 2302 processes upstream traffic at $\lambda_u$ received from power splitter 2320a via filter 2310.

Pluggable module 2600 may, for example, replace pluggable module 2500 after an upgrade from a WS-HPON routing two WDM wavelengths to a WS-HPON routing four WDM wavelengths. Alternatively, module 2600 may replace module 2400 after an upgrade from PSPON. When pluggable module 2600 is coupled to traffic distribution module 2300, filter 2310 receives downstream traffic in $\lambda_v$ and $\lambda_1$-$\lambda_4$ (one of which may be reused PSPON wavelength $\lambda_d$) from OLT 2302, directs traffic in $\lambda_v$ to power splitter 2320a, and directs traffic in $\lambda_1$-$\lambda_4$ to connector 2330. Power splitter 2320a receives the traffic in $\lambda_v$ from filter 2310 (and no traffic from connector 2332), splits the received traffic into a suitable number of copies, and forwards each copy to a corresponding power splitter 2320b. Each power splitter 2320b receives traffic in $\lambda_v$ from power splitter 2320a (and no traffic from connector 2333), splits the received traffic into a suitable number of copies, and forwards each copy to a corresponding power splitter 2320c. Connector 2330 receives the traffic in $\lambda_1$-$\lambda_4$ and forwards the traffic via connector 2630 of pluggable module 2600 (into which it is plugged) to wavelength router 2631. Wavelength router 2631 demultiplexes the constituent wavelengths ($\lambda_1$-$\lambda_4$) and routes traffic in each wavelength to a corresponding one of connectors 2634. Each connector 2634 receives traffic in a corresponding one of $\lambda_1$-$\lambda_4$ from wavelength router 2631 and forwards the received traffic via a corresponding one of connectors 2334 in traffic distribution module 2300 to a corresponding power splitter 2320c.

Each power splitter 2320c receives a copy of downstream traffic in $\lambda_v$ from power splitter 2320b and downstream traffic in a corresponding one of $\lambda_1$-$\lambda_4$ from a corresponding connector 2334, combines the traffic into one signal, splits the signal into a suitable number of copies, and forwards each copy to a corresponding power splitter 2320d. Each power splitter 2320d receives a copy from power splitter 2320c (and no traffic from corresponding connector 2335), splits the copy into a suitable number of copies, and forwards each resulting copy to additional downstream power splitters (i.e., 2320e, which process received traffic analogously to upstream power splitters) or directly to ONUs 2304. Each ONU 2304 receives and processes the traffic in $\lambda_v$ and a corresponding one of $\lambda_1$-$\lambda_4$. In this way, module 2600 may be coupled to traffic distribution module 2300 to allow each of four groups of wavelength sharing ONUs to share a corresponding wavelength in a WS-HPON, where one of the WDM wavelengths may be reused PSPON wavelength $\lambda_d$. Optionally, all ONUs may also receive broadcast traffic in $\lambda_v$.

In the upstream direction, each ONU 2304 transmits upstream traffic at time-shared $\lambda_u$ and forwards the traffic to a corresponding power splitter (i.e., 2320d). Each power splitter 2320d receives upstream traffic from corresponding downstream ONUs 2304, combines the traffic into one signal, splits the signal into a suitable number of copies, and forwards a copy to power splitter 2320c. Power splitters 2320 forward traffic in $\lambda_u$ to upstream splitters until the traffic in $\lambda_u$ is received by power splitter 2320a. Power splitter 2320a receives the traffic in $\lambda_u$, combines the traffic into one signal, splits the signal into two copies, and forwards a copy to filter 2310. Connectors 2335, 2333, and 2332 receiving copies of the upstream traffic facilitate the termination of the copies they receive. Upstream traffic received at module 2600 may be terminated at wavelength router 2631 (or, alternatively, may pass through the module and be terminated at filter 2310) to avoid collision with the same upstream traffic received at filter 2310 from power splitter 2320a. OLT 2302 processes upstream traffic at $\lambda_u$ received from power splitter 2320a via filter 2310.

Pluggable module 2700 may, for example, replace pluggable module 2600 after an upgrade from a WS-HPON routing four WDM wavelengths to a WS-HPON routing eight WDM wavelengths. Alternatively, pluggable module 2700 may, for example, replace pluggable module 2500 after an upgrade from a WS-HPON routing two WDM wavelengths to a WS-HPON routing eight WDM wavelengths. Alternatively, module 2700 may replace module 2400 after an upgrade from PSPON.

When pluggable module 2700 is coupled to traffic distribution module 2300, filter 2310 receives downstream traffic in $\lambda_v$ and $\lambda_1$-$\lambda_8$ (one of which may be reused PSPON wavelength $\lambda_d$) from OLT 2302, directs traffic in $\lambda_v$ to power splitter 2320a, and directs traffic in $\lambda_1$-$\lambda_8$ to connector 2330. Power splitter 2320a receives the traffic in $\lambda_v$ from filter 2310 (and no traffic from connector 2332), splits the received traffic into a suitable number of copies, and forwards each copy to a corresponding power splitter 2320b. Each power splitter 2320b receives traffic in $\lambda_v$ from power splitter 2320a (and no traffic from connector 2333), splits the received traffic into a suitable number of copies, and forwards each copy to a corresponding power splitter 2320c. Each power splitter 2320c receives traffic in $\lambda_v$ from power splitter 2320b (and no traffic from connector 2334), splits the received traffic into a suitable number of copies, and forwards each copy to a corresponding power splitter 2320d.

Connector 2330 receives the traffic in $\lambda_1$-$\lambda_8$ and forwards the traffic via connector 2730 of pluggable module 2700 (into which it is plugged) to wavelength router 2731. Wavelength router 2731 demultiplexes the constituent wavelengths ($\lambda_1$-$\lambda_8$) and routes traffic in each wavelength to a corresponding one of connectors 2735. Each connector 2735 receives traffic in a corresponding one of $\lambda_1$-$\lambda_8$ from wavelength router 2731 and forwards the received traffic via a corresponding one of connectors 2335 in traffic distribution module 2300 to a corresponding power splitter 2320d.

Each power splitter 2320d receives a copy of downstream traffic in $\lambda_v$ from power splitter 2320c and downstream traffic in a corresponding one of $\lambda_1$-$\lambda_8$ from a corresponding connector 2335, combines the traffic into one signal, splits the signal into a suitable number of copies, and forwards each resulting copy to additional downstream power splitters (i.e., 2320e which process received traffic analogously to upstream power splitters) or directly to ONUs 2304. Each ONU 2304 receives and process the traffic in $\lambda_v$ and a corresponding one of $\lambda_1$-$\lambda_8$. In this way, module 2700 may be coupled to traffic distribution module 2300 to allow each of eight groups of wavelength sharing ONUs to share a corresponding wavelength in a WS-HPON, where one of the WDM wavelengths may be reused PSPON wavelength $\lambda_d$. Optionally, all ONUs may also receive broadcast traffic in $\lambda_v$.

In the upstream direction, each ONU 2304 transmits upstream traffic at time-shared $\lambda_u$ and forwards the traffic to a corresponding power splitter (i.e., 2320d). Each power splitter 2320d receives upstream traffic from corresponding downstream ONUs 2304, combines the traffic into one signal, splits the signal into a suitable number of copies, and forwards a copy to power splitter 2320c. Power splitters 2320 forward traffic in $\lambda_u$ to upstream splitters until the traffic in $\lambda_u$ is received by power splitter 2320a. Power splitter 2320a receives the traffic in $\lambda_u$, combines the traffic into one signal, splits the signal into two copies, and forwards a copy to filter 2310. Connectors 2334, 2333, and 2332 receiving copies of the upstream traffic facilitate the termination of the copies they receive. Upstream traffic received at module 2700 may be terminated at wavelength router 2731 (or, alternatively, may pass through the module and be terminated at filter 2310) to avoid collision with the same upstream traffic received at filter 2310 from power splitter 2320a. OLT 2302 processes upstream traffic in $\lambda_u$ received from power splitter 2320a via filter 2310.

Module 2800 may be coupled to traffic distribution module 2300 to provide a PSPON RN or a WS-HPON RN routing two, four, or eight WDM wavelengths to groups of wavelength-sharing ONUs. After coupling module 2800 to traffic distribution module 2300 (although the two may be fixed when manufactured in particular embodiments), upgrades from a PSPON RN to an HPON RN or from an HPON RN routing less WDM wavelengths to an HPON RN routing more WDM wavelengths may be performed in-service (because, for example, no modifications need be made to the traffic distribution module 2300/routing module 2800 combination for each upgrade).

During operation in a PSPON, when coupled to section 2300, wavelength router 2831 receives downstream traffic and routes the received traffic from its first output port to power splitter 2320a. Downstream and upstream operation is analogous to that described above in conjunction with section 2300 and module 2400 and will not be described again. However, it should be noted that wavelength router 2831 may facilitate termination of any received upstream traffic (and, in particular embodiments, this traffic may not be forwarded to filter 2310 for termination, as may be the case with module 2400).

During operation in a WS-HPON routing two WDM wavelengths, when coupled to section 2300, wavelength router 2831 receives downstream traffic in two wavelengths and routes traffic in each wavelength from a corresponding one of its second and third output ports. In particular embodiments, the two received and routed wavelengths may be different from the downstream wavelength used during operation in the PSPON (so that each wavelength is routed to a corresponding splitter 2320b and not to splitter 2320a). One wavelength may be shared by one group of wavelength-sharing ONUs, and the other wavelength may be shared by another group of wavelength-sharing ONUs. Downstream and upstream operation is analogous to that described above in conjunction with module 2500 and will not be described again.

During operation in a WS-HPON routing four WDM wavelengths, when coupled to section 2300, wavelength router 2831 receives downstream traffic in four wavelengths and routes traffic in each wavelength from a corresponding one of its fourth through seventh output ports. In particular embodiments, the four wavelengths may be different from the PSPON downstream wavelength and from the two WDM wavelengths used in the two-wavelength WS-HPON (so that each wavelength is routed to a corresponding splitter 2320c).

Each of the four wavelengths may be shared by a corresponding group of wavelength-sharing ONUs. Downstream and upstream operation is analogous to that described above in conjunction with module 2600 and will not be described again.

During operation in a WS-HPON routing eight WDM wavelengths, when coupled to section 2300, wavelength router 2831 receives downstream traffic in eight wavelengths and routes traffic in each wavelength from a corresponding one of its eighth through fifteenth output ports. In particular embodiments, these eight wavelengths may be different from the PSPON downstream wavelength and from the six wavelengths used in the two- and four-wavelength WS-HPONs (so that each wavelength is routed to a corresponding splitter 2320d). Each of the eight wavelengths may be shared by a corresponding group of wavelength-sharing ONUs. Downstream and upstream operation is analogous to that described above in conjunction with module 2700 and will not be described again.

Modifications, additions, or omissions may be made to the systems and methods described without departing from the scope of the invention. The components of the systems and methods described may be integrated or separated according to particular needs. Moreover, the operations of the systems and methods described may be performed by more, fewer, or other components.

Figure 11:
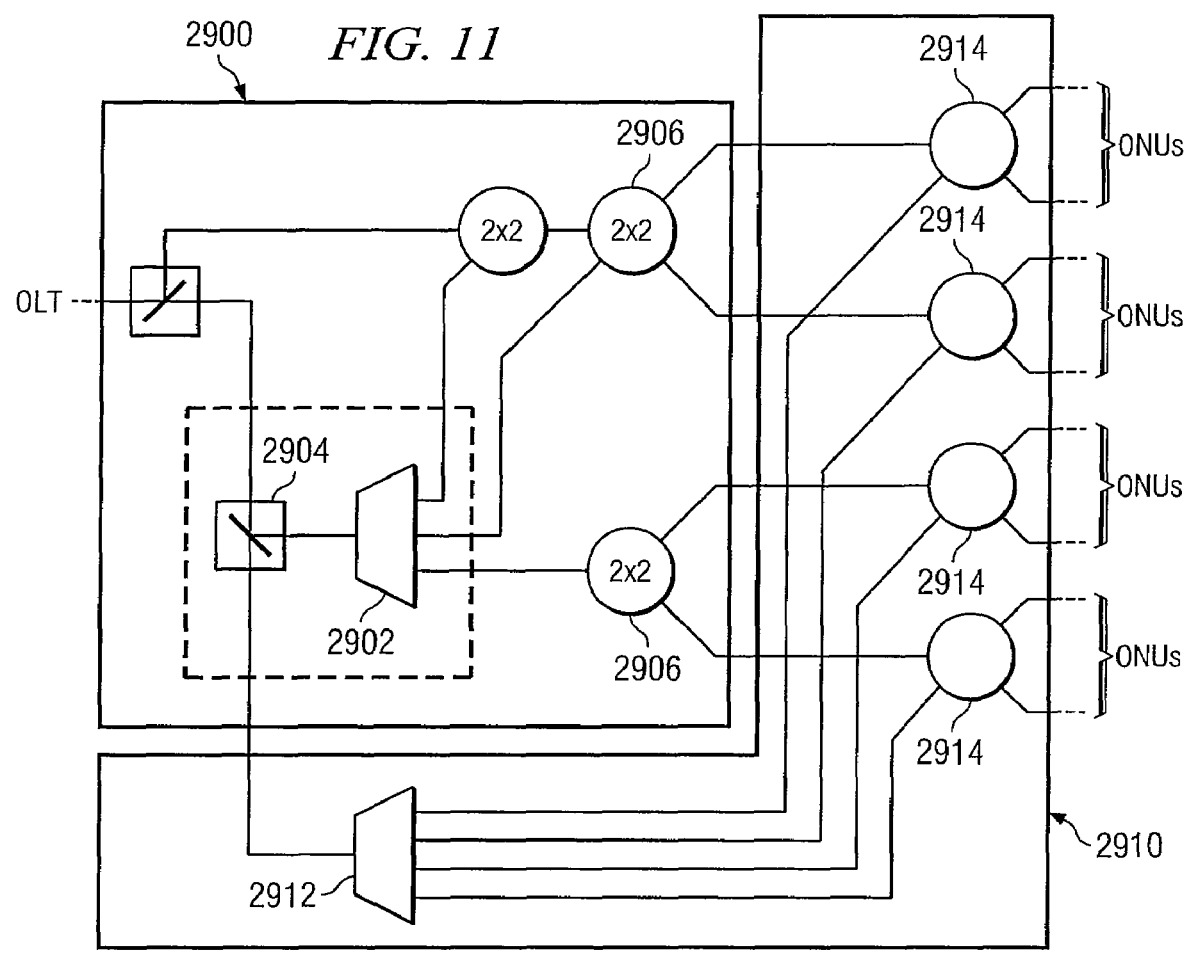
FIG. 11 is a diagram illustrating yet another example upgradeable traffic distribution module and an associated traffic routing module.

FIG. 11 is a diagram illustrating yet another example upgradeable traffic distribution module 2900 and associated traffic routing module 2910. Instead of doubling the bandwidth per user after each upgrade, when module 2910 is coupled to traffic distribution module 2900, the number of ONUs (or users) in the PON may be increased. In particular embodiments, the bandwidth per user may remain constant by increasing the number of downstream WDM wavelengths by the same factor as the number of ONUs added.

Example upgradeable traffic distribution module 2900 may be similar to traffic distribution module 2300 coupled to module 2800. However, the illustrated routing multiplexer 2902 is a 1×3 demultiplexer (not a 1×15 demultiplexer). In addition, traffic distribution module 2900 comprises an additional filter 2904. Filter 2904 may comprise any suitable filter operable to direct received PSPON traffic or received two-wavelength WS-HPON traffic to multiplexer 2902 and to direct traffic in WS-HPONs routing more than two wavelengths (i.e., four wavelengths) to a suitable module (i.e., module 2910). Additionally, power splitters 2906 in traffic distribution module 2900 are configured to couple to power splitters 2914 of module 2910 after an upgrade.

Module 2910 comprises a multiplexer 2912 and power splitters 2914. Multiplexer 2912 may comprise any suitable multiplexer operable to receive traffic, demultiplex the traffic into its constituent wavelengths, and forward the traffic in each wavelength to a corresponding power splitter 2914. Each power splitter 2914 may comprise any suitable power splitter configured to couple to multiplexer 2912 at one input port, a corresponding power splitter 2906 of traffic distribution module 2900 at another input port, and ONUs (or additional couplers which are coupled to ONUs) at the output ports. When module 2910 is coupled to traffic distribution module 2900, each power splitter 2914 is operable to receive traffic in a corresponding wavelength from multiplexer 2912, receive broadcast traffic (if any) from traffic distribution module 2900, combine the received traffic, split the combined traffic into two copies and forward the copies to all ONUs (including the additional ONUs).

In operation, traffic distribution module 2900 may distribute downstream traffic in a PSPON or two-wavelength WS- HPON to a suitable number of ONUs (i.e., thirty-two). When module 2910 is coupled to traffic distribution module 2900, the number of ONU ports is increased. Additional ONUs may then be coupled to the additional ports. In particular embodiments, the number of ONUs may be increased by the same factor (i.e., from thirty-two to sixty-four) as the increase in routed downstream WDM wavelengths (i.e., from two to four WDM wavelengths). Downstream WDM traffic routed through module 2910 and broadcast traffic (if any) routed through traffic distribution module 2900 are combined at power splitters 2914. Power splitters 2914 split the combined traffic and forward the traffic to the larger number of ONUs.

Modifications, additions, or omissions may be made to the systems and methods described without departing from the scope of the invention. The components of the systems and methods described may be integrated or separated according to particular needs. Moreover, the operations of the systems and methods described may be performed by more, fewer, or other components.

Although the present invention has been described with several embodiments, various changes and modifications may be suggested to one skilled in the art. It is intended that the present invention encompass such changes and modifications as fall within the scope of the appended claims.

What is claimed:

1. A traffic distribution module in a passive optical network (PON), comprising:
    a filter configured to:
        receive downstream traffic in a first set of one or more wavelengths and a second set of one or more wavelengths from an optical line terminal (OLT);
        direct the traffic in the first set of wavelengths to a primary power splitter; and
        direct the traffic in the second set of wavelengths to a first connector;
    a primary power splitter and a plurality of secondary power splitters, the primary power splitter configured to receive the traffic in the first set of wavelengths and distribute the traffic in the first set to the plurality of secondary power splitters coupled to the primary power splitter such that optical network units (ONUs) in the PON receive the traffic in the first set of wavelengths;
    a first connector configured to couple to a first module connector of a pluggable module and to forward the traffic in the second set of wavelengths to the pluggable module via the first module connector; and
    a plurality of second connectors configured to:
        couple to a plurality of second module connectors of the pluggable module;
        receive the traffic in the second set of wavelengths from the pluggable module via the associated second module connectors; and
        forward the traffic in the second set to the plurality of secondary power splitters for distribution to particular ONUs in the PON.

2. The traffic distribution module of claim 1, further comprising a third connector configured to:
    couple to a third module connector of the pluggable module;
    receive traffic from the pluggable module via the associated third module connector; and
    forward the received traffic to the primary power splitter.

3. The traffic distribution module of claim 2, wherein the pluggable module comprises a fiber loop coupled between the first module connector and the third module connector.

4. The traffic distribution module of claim 1, wherein the pluggable module comprises a power splitter configured to:
    receive the traffic in the second set of wavelengths from the first connector via the first module connector;
    split the traffic in the second set of wavelengths into a plurality of copies; and
    forward a copy to each second connector.

5. The traffic distribution module of claim 1, wherein the pluggable module comprises a wavelength router configured to:
    receive traffic at a plurality of wavelengths in the second set of wavelengths from the first connector via the first module connector;
    separate the received traffic in each wavelength; and
    route the traffic in each separated wavelength to a corresponding one of the second connectors.

6. The traffic distribution module of claim 1, wherein:
    the plurality of secondary power splitters comprises a first set of secondary power splitters and a second set of secondary power splitters;
    each secondary power splitter in the first set of secondary power splitters is coupled to at least two downstream secondary power splitters in the second set of secondary power splitters;
    the plurality of second connectors comprises a first set of second connectors and a second set of second connectors different than the first set of second connectors;
    each of the first set of secondary power splitters is directly connected to a corresponding one of the first set of second connectors; and
    each of the second set of secondary power splitters is directly connected to a corresponding one of the second set of second connectors.

7. A distribution node in a passive optical network (PON), comprising:
    a filter configured to:
        receive downstream traffic in a first set of one or more wavelengths, a second set of one or more wavelengths, a third set of one or more wavelengths, and a fourth set of one or more wavelengths from an optical line terminal (OLT);
        direct the traffic in the first set of wavelengths to a primary power splitter; and
        direct the traffic in the second, third, and fourth sets of wavelengths to a wavelength router;
    a primary power splitter configured to receive the traffic in the first set of wavelengths and distribute the traffic in the first set to a plurality of secondary power splitters coupled to the primary power splitter such that optical network units (ONUs) in the PON receive the traffic in the first set of wavelengths;
    a plurality of secondary power splitters coupled to the primary power splitter and configured to receive the traffic in the first set of wavelengths from the primary power splitter, the plurality of secondary power splitters comprising a first set of secondary power splitters and a second set of secondary power splitters, wherein each secondary power splitter in the first set of secondary power splitters is coupled to at least two downstream secondary power splitters in the second set of secondary power splitters;
    a wavelength router configured to:
        receive the traffic in the second, third, and fourth sets of wavelengths from the filter;
        route the traffic in the second set of wavelengths to the primary power splitter;
        route the traffic in the third set of wavelengths to the first set of secondary power splitters; and
        route the traffic in the fourth set of wavelengths to the second set of secondary power splitters.

8. The distribution node of claim 7, wherein the wavelength router comprises a demultiplexer.

* * * * *